(12) United States Patent
Maugans, III et al.

(10) Patent No.: US 11,861,628 B2
(45) Date of Patent: *Jan. 2, 2024

(54) METHOD, SYSTEM AND COMPUTER READABLE MEDIUM FOR CREATING A PROFILE OF A USER BASED ON USER BEHAVIOR

(71) Applicant: Clickagy LLC, Vancouver, WA (US)

(72) Inventors: Harry Russell Maugans, III, Roswell, GA (US); Cody Alan Carrell, Roswell, GA (US)

(73) Assignee: CLICKAGY LLC, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,367

(22) Filed: Sep. 16, 2020

(65) Prior Publication Data

US 2020/0410515 A1 Dec. 31, 2020

Related U.S. Application Data

(63) Continuation of application No. 15/177,168, filed on Jun. 8, 2016, now Pat. No. 10,783,534.
(Continued)

(51) Int. Cl.
*G06F 16/90* (2019.01)
*H04L 67/50* (2022.01)
(Continued)

(52) U.S. Cl.
CPC ..... *G06Q 30/0201* (2013.01); *G06F 16/9535* (2019.01); *G06F 16/9566* (2019.01);
(Continued)

(58) Field of Classification Search
CPC .................................................. G06F 16/9535
See application file for complete search history.

(56) References Cited

U.S. PATENT DOCUMENTS 8,341,540 B1 12/2012 Haynes et al.
8,433,785 B2 4/2013 Awadallah et al.
(Continued)

FOREIGN PATENT DOCUMENTS

CN 101164077 4/2008
WO 2010065032 A 6/2010
WO 2015128862 9/2015

OTHER PUBLICATIONS

U.S. Non-Final Office Action dated Jun. 11, 2018 cited in U.S. Appl. No. 15/177,204, 20 pgs.
(Continued)

*Primary Examiner* — Kristopher Andersen
(74) *Attorney, Agent, or Firm* — Summit Patents PC

(57) ABSTRACT

Disclosed is a computer implemented method of creating a profile of a user based on user behavior. The method may include receiving a plurality of Universal Resource Locators (URLs) corresponding to a plurality of webpages visited by the user. Further, the method may include retrieving content from each of the plurality of webpages based on the plurality of URLs. Furthermore, the method may include analyzing content from each of the plurality of webpages. Additionally, analyzing content from a webpage may include analyzing content corresponding to each content type present on the webpage. Further, the method may include identifying a plurality of keywords corresponding to the webpage based on the analyzing. Furthermore, the plurality of keywords may be associated with a plurality of affinity values. The plurality of keywords and the plurality of affinity values may constitute the profile of the user.

14 Claims, 14 Drawing Sheets

Related U.S. Application Data

(60) Provisional application No. 62/173,071, filed on Jun. 9, 2015.

(51) Int. Cl.

| | | |
|---|---|---|
| *G06Q 30/0201* | (2023.01) | |
| *G06Q 30/0202* | (2023.01) | |
| *G06F 21/62* | (2013.01) | |
| *G06F 16/9535* | (2019.01) | |
| *G06F 16/955* | (2019.01) | |
| *G06F 21/31* | (2013.01) | |
| *H04L 9/40* | (2022.01) | |
| *G06F 40/279* | (2020.01) | |
| *G06Q 30/0251* | (2023.01) | |
| *G06Q 30/0273* | (2023.01) | |
| *H04L 67/02* | (2022.01) | |
| *H04L 67/306* | (2022.01) | |
| *G06Q 30/02* | (2023.01) | |
| *G06F 21/60* | (2013.01) | |
| *G06F 21/30* | (2013.01) | |
| *H04L 67/00* | (2022.01) | |
| *G06F 40/20* | (2020.01) | |
| *H04L 17/30* | (2006.01) | |

(52) U.S. Cl.
CPC ........ *G06F 21/316* (2013.01); *G06F 21/6263* (2013.01); *G06F 40/279* (2020.01); *G06Q 30/0202* (2013.01); *G06Q 30/0255* (2013.01); *G06Q 30/0269* (2013.01); *G06Q 30/0275* (2013.01); *H04L 63/0407* (2013.01); *H04L 67/02* (2013.01); *H04L 67/306* (2013.01); *H04L 67/535* (2022.05); *G06F 2221/2101* (2013.01)

(56) References Cited

U.S. PATENT DOCUMENTS

| | | |
|---|---|---|
| 8,494,897 B1 | 7/2013 | Dawson |
| 8,666,812 B1 | 3/2014 | Gandhi |
| 8,719,081 B1 | 5/2014 | Langrock et al. |
| 8,812,960 B1 | 8/2014 | Sun et al. |
| 8,909,771 B2 | 12/2014 | Heath |
| 8,914,500 B1 | 12/2014 | Liu et al. |
| 8,966,649 B2 | 2/2015 | Stack et al. |
| 9,460,390 B1 * | 10/2016 | Lin ................. G06N 7/01 |
| 9,552,334 B1 | 1/2017 | Meisels et al. |
| 9,626,677 B2 | 4/2017 | Turgeman et al. |
| 9,665,703 B2 | 5/2017 | Turgeman et al. |
| 9,727,654 B2 | 8/2017 | Ytkin et al. |
| 9,870,577 B1 | 1/2018 | Yang et al. |
| 10,535,082 B1 | 1/2020 | Hannebaum et al. |
| 10,783,534 B2 | 9/2020 | Maugans, III et al. |
| 2002/0111994 A1 | 8/2002 | Raghunandan |
| 2002/0198777 A1 | 12/2002 | Yuasa |
| 2007/0088603 A1 | 4/2007 | Jouppi et al. |
| 2007/0100796 A1 | 5/2007 | Wang |
| 2008/0010137 A1 | 1/2008 | Ho et al. |
| 2008/0066107 A1 | 3/2008 | Moonka et al. |
| 2008/0201206 A1 | 8/2008 | Pokorney et al. |
| 2008/0248815 A1 | 10/2008 | Busch |
| 2009/0012852 A1 | 1/2009 | O'Kelley et al. |
| 2009/0125387 A1 | 5/2009 | Mak et al. |
| 2009/0198666 A1 | 8/2009 | Winston et al. |
| 2009/0204478 A1 | 8/2009 | Kaib et al. |
| 2009/0234711 A1 | 9/2009 | Ramer et al. |
| 2009/0234727 A1 | 9/2009 | Petty |
| 2009/0327296 A1 | 12/2009 | Francis et al. |
| 2009/0327488 A1 | 12/2009 | Sampat et al. |
| 2010/0057560 A1 | 3/2010 | Skudlark et al. |
| 2010/0082660 A1 | 4/2010 | Muilenberg et al. |
| 2010/0100440 A1 | 4/2010 | Nickelson, III et al. |
| 2010/0235266 A1 | 9/2010 | Sirajuddin et al. |
| 2011/0035375 A1 | 2/2011 | Bekkerman |
| 2011/0066497 A1 | 3/2011 | Gopinath et al. |
| 2011/0112862 A1 | 5/2011 | Yu |
| 2011/0119591 A1 | 5/2011 | Veeraraghavan et al. |
| 2011/0173126 A1 | 7/2011 | Knapp et al. |
| 2011/0314114 A1 | 12/2011 | Young, III et al. |
| 2012/0010995 A1 | 1/2012 | Skirpa et al. |
| 2012/0047005 A1 | 2/2012 | Connelly et al. |
| 2012/0054213 A1 | 3/2012 | Puttaswamy et al. |
| 2012/0059713 A1 | 3/2012 | Galas et al. |
| 2012/0095834 A1 | 4/2012 | Doig et al. |
| 2012/0215844 A1 | 8/2012 | Ferlez et al. |
| 2013/0066933 A1 | 3/2013 | Mendiratta et al. |
| 2013/0138514 A1 | 5/2013 | Yan et al. |
| 2013/0151334 A1 | 6/2013 | Berkhin et al. |
| 2013/0159110 A1 | 6/2013 | Rajaram et al. |
| 2013/0159505 A1 | 6/2013 | Mason et al. |
| 2013/0179790 A1 | 7/2013 | Nadiadi et al. |
| 2013/0198125 A1 | 8/2013 | Oliver et al. |
| 2013/0211873 A1 | 8/2013 | Varadarajan et al. |
| 2013/0346201 A1 | 12/2013 | Bilange |
| 2014/0052540 A1 | 2/2014 | Rajaram et al. |
| 2014/0074610 A1 | 3/2014 | Bilange |
| 2014/0143052 A1 | 5/2014 | Stryker |
| 2014/0278998 A1 | 9/2014 | Systrom et al. |
| 2014/0279048 A1 | 9/2014 | Wohlstadter |
| 2014/0289006 A1 | 9/2014 | Palmer et al. |
| 2014/0304069 A1 | 10/2014 | Lacey et al. |
| 2015/0006529 A1 | 1/2015 | Kneen et al. |
| 2015/0088598 A1 | 3/2015 | Acharyya et al. |
| 2015/0106156 A1 | 4/2015 | Chang et al. |
| 2015/0106157 A1 | 4/2015 | Chang et al. |
| 2015/0142888 A1 | 5/2015 | Browning et al. |
| 2015/0193470 A1 | 7/2015 | Romaya |
| 2015/0215668 A1 | 7/2015 | Chawla |
| 2016/0006806 A1 | 1/2016 | Abraham et al. |
| 2016/0140589 A1 | 5/2016 | Deshpande et al. |
| 2016/0140620 A1 | 5/2016 | Pinkowish et al. |
| 2016/0171542 A1 | 6/2016 | Fanous et al. |
| 2016/0180083 A1 | 6/2016 | Costigan et al. |
| 2016/0180403 A1 | 6/2016 | Ganesh et al. |
| 2016/0232564 A1 | 8/2016 | Blackhurst et al. |
| 2016/0335674 A1 | 11/2016 | Plourde |
| 2016/0364490 A1 | 12/2016 | Maugans III |
| 2016/0364736 A1 | 12/2016 | Maugans, III |
| 2016/0364762 A1 | 12/2016 | Maugans, III |
| 2016/0364767 A1 | 12/2016 | Maugans, III |
| 2017/0185758 A1 | 6/2017 | Oliker et al. |
| 2017/0357987 A1 | 12/2017 | Maugans, III et al. |
| 2019/0213612 A1 | 7/2019 | Maugans, III et al. |
| 2019/0370831 A1 | 12/2019 | Maugans, III et al. |

OTHER PUBLICATIONS

U.S. Non-Final Office Action dated Jul. 2, 2018 cited in U.S. Appl. No. 15/177,193, 15 pgs.
U.S. Final Office Action dated May 2, 2019 cited in U.S. Appl. No. 15/177,193, 13 pgs.
U.S. Non-Final Office Action dated Oct. 31, 2019 cited in Application No. 15/177, 178, 26 pgs.
U.S. Non-Final Office Action dated May 29, 2020 cited in U.S. Appl. No. 15/177,193, 31 pgs.
U.S. Final Office Action dated Aug. 25, 2020 cited in U.S. Appl. No. 15/177,178, 26 pgs.
Non-Final Office action, dated Apr. 5, 2021, in U.S. Appl. No. 16/544,059, filed Aug. 19, 2019.
2d Office action, dated Sep. 28, 2021, in U.S. Appl. No. 15/177,178, filed Jun. 8, 2016.
Yu et al "An extended support vector machine forecasting framework for customer churn in e-commerce." Expert Systems with Applications 38 (2011) 1425-1430. (Year: 2011).
Non-Final Office action, dated Feb. 21, 2020, in U.S. Appl. No. 16/354,101, filed Mar. 14, 2019.
Final Office action, dated Dec. 8, 2020, in U.S. Appl. No. 16/354,101, filed Mar. 14, 2019.

(56) References Cited

OTHER PUBLICATIONS

Final Office action, dated Dec. 9, 2020, in U.S. Appl. No. 15/177,193, filed Jun. 8, 2016.
Non-Final Office action, dated Jan. 4, 2018, in U.S. Appl. No. 15/689,845, filed Aug. 29, 2017.
Final Office action, dated Sep. 5, 2018 in U.S. Appl. No. 15/689,845, filed Aug. 29, 2017.
Non-Final Office action, dated Jan. 13, 2020, in U.S. Appl. No. 15/689,845, filed Aug. 9, 2017.
Final Office action, dated Oct. 20, 2020, in U.S. Appl. No. 15/689,845, filed Aug. 29, 2017.
Non-Final Office action, dated May 24, 2018, in U.S. Appl. No. 15/177,168, filed Jun. 8, 2016.
Final Office action, dated Feb. 25, 2019, in U.S. Appl. No. 15/177,168, filed Jun. 8, 2016.
Non-Final Office action, dated Oct. 4, 2019, in U.S. Appl. No. 15/177,168, filed Jun. 8, 2016.
Non-Final Office action, dated May 29, 2020, in U.S. Appl. No. 15/177,193, filed Jun. 8, 2016.
Non-Final Office action, dated Dec. 23, 2021, in U.S. Appl. No. 16/354,101, filed Mar. 14, 2019.
"Create remarketing lists", support.google.com, archived on Jul. 27, 2014, https://web.archive.org/web/20140727174148/https:// support.google.com/analytics/answer/2611404?hl=en (Year: 2014).

\* cited by examiner

METHOD, SYSTEM AND COMPUTER READABLE MEDIUM FOR CREATING A PROFILE OF A USER BASED ON USER BEHAVIOR

RELATED APPLICATIONS

This application is a continuation of U.S. application Ser. No. 15/177,168 filed on Jun. 8, 2016, which issues on Sep. 22, 2020 as U.S. Pat. No. 10,783,534, which claims priority to U.S. Provisional Application No. 62/173,071 filed Jun. 9, 2015, which are incorporated herein by reference.

The following related U. S. patent applications, in the name of Clickagy, LLC, assigned to the assignee of the present application, are hereby incorporated by reference:

U.S. application Ser. No. 15/177,178 filed Jun. 8, 2016, entitled "METHOD AND SYSTEM FOR PROVIDING BUSINESS INTELLIGENCE BASED ON USER BEHAVIOR;"

U.S. application Ser. No. 15/177,193 filed Jun. 8, 2016, entitled "METHOD AND SYSTEM FOR CREATING AN AUDIENCE LIST BASED ON USER BEHAVIOR DATA;" and U.S. application Ser. No. 15/177,204 filed Jun. 8, 2016, entitled "METHOD AND SYSTEM FOR INFLUENCING AUCTION BASED ADVERTISING OPPORTUNITIES BASED ON USER CHARACTERISTICS."

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to data mining. More specifically, the present disclosure relates to a method, system and computer readable medium for creating a profile of a user based on user behavior and presenting promotional material to the user based on the profile.

BACKGROUND

Individuals and companies often use data derived from the Internet to optimize business strategies. For example, data derived from the Internet may be used to study demographics, psychographics, market behavior, competitor affinity, targeted marketing, and expanding markets. For example, companies often use market data to best market their products and services. Moreover, companies often use targeted marketing to specific individuals to try to improve marketing effectiveness.

When consumers visit a website, the pages they visit, the amount of time they view each page, the links they click on, the searches they make and the things that they interact with, allow sites to collect that data, and other factors, create a 'profile' that links to that visitor's web browser. As a result, companies can use this data to create defined audience segments based upon visitors that have similar profiles. When visitors return to a specific site or a network of sites using the same web browser, those profiles can be used to allow advertisers to position their online ads in front of those visitors who exhibit a greater level of interest and intent for the products and services being offered. On the theory that properly targeted ads will fetch more consumer interest, the publisher (or seller) can charge a premium for these ads over random advertising or ads based on the context of a site.

Behavioral marketing can be used on its own or in conjunction with other forms of targeting based on factors like geography, demographics or contextual web page content.

While there is an abundance of data from global Internet use, much of the data is unavailable due to privacy laws. The information that is available is often too general to be useful and does not provide adequate resolution.

BRIEF OVERVIEW

A user profile creation platform may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

According to some embodiments, a computer implemented method of creating a profile of a user based on user behavior may be provided. The user behavior may include for example, online activity performed by the user such as viewing webpages, online shopping, downloading content from the internet, uploading content to the internet and interacting with a desktop application and/or a mobile application. In various other embodiments, and as will be detailed below, the data may not be limited to internet data. For example, call data, correspondence data, multimedia data, and many other data sources may be used.

A user profile may be created by assessing the aggregate history of data associated with the user (for example, but not limited to, internet data). The data may be analyzed to determine, as one example, a plurality of keywords to be associated with the user profile. A user profile may further include a history of internet usage (e.g., websites visited) and a list of associated keywords determined from each website based. The keywords may be extracted in accordance to embodiments disclosed herein.

Still consistent with embodiments of the present disclosure, a user profile may include affinity data. Affinity data may be determined by assessing the history of keywords associated with the user behavior to make certain calculations as to the likelihood of user characteristics. Affinity data may be calculated using, at least in part, for example, a machine learning technique. The machine learning algorithm may be trained with a deterministic group. The deterministic group may be comprised of the behavioral patterns of known user identities (e.g., lawyers, males, car shoppers, etc.). As will be detailed below, the patterns are 'learned' and then may be transposed to unknown user profiles so as to determine affinity ratings for those unknown user identities.

Further, in some embodiments, data representing the user behavior may be de-identified. In other words, data representing the user behavior may not include identifiable information such as name, phone number, postal address, bank account number and so on. Accordingly, privacy of users may be preserved. For instance, data representing the user behavior may include a list of URLs visited by the user and a corresponding list of times when the user accessed the URLs.

In order to create the user profile, the method may include a step of receiving a plurality of Universal Resource Locators (URLs) corresponding to a plurality of webpages visited by the user. Further, the method may include retrieving content from each of the plurality of webpages based on the plurality of URLs. For instance, a crawler program may be executed on a processor to automatically retrieve content from each of the plurality of webpages by accessing the plurality of URLs.

Subsequent to retrieving the content, the method may include a step of analyzing the content from each of the plurality of webpages. In some embodiments, analyzing content from a webpage may include analyzing content corresponding to each content type present on the webpage. For example, both textual content and non-textual content such as audio, images, video and multimedia on the webpage may be analyzed.

Further, in some embodiments, the analyzing may include performing Natural Language Processing (NLP) of a textual content in the webpage. Additionally, in some embodiments, in case the webpage consists of non-textual content, a step of converting the non-textual content into textual content may be performed. Subsequently, the NLP may be performed on the converted content.

Based on the analyzing, the method may include a step of identifying a plurality of keywords corresponding to the webpage. Furthermore, the plurality of keywords may be associated with a plurality of affinity values. The plurality of keywords and the plurality of affinity values may constitute the profile of the user.

Further, in some embodiments, the method may further include a step of determining an aggregated affinity value corresponding to a keyword based on a first affinity value of the keyword corresponding to a first webpage and a second affinity value of the keyword corresponding to a second webpage. In other words, the aggregated affinity value may represent an overall affinity of the keyword to the user based on the user's interaction with a plurality of webpages containing the keyword.

Further, in some embodiments, the aggregated affinity value may further be based on a time decay value associated with each of the first affinity value and the second affinity value. For instance, each of the first affinity value and the second affinity value may be weighted based on a time decay value. Accordingly, an impact of an affinity value on the aggregated affinity value may be controlled according to for example, a "freshness" associated with the affinity value. For instance, an affinity value of the keyword associated with a first webpage visited a week ago may be weighted more than an affinity value of the keyword associated with a second webpage visited a month ago.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
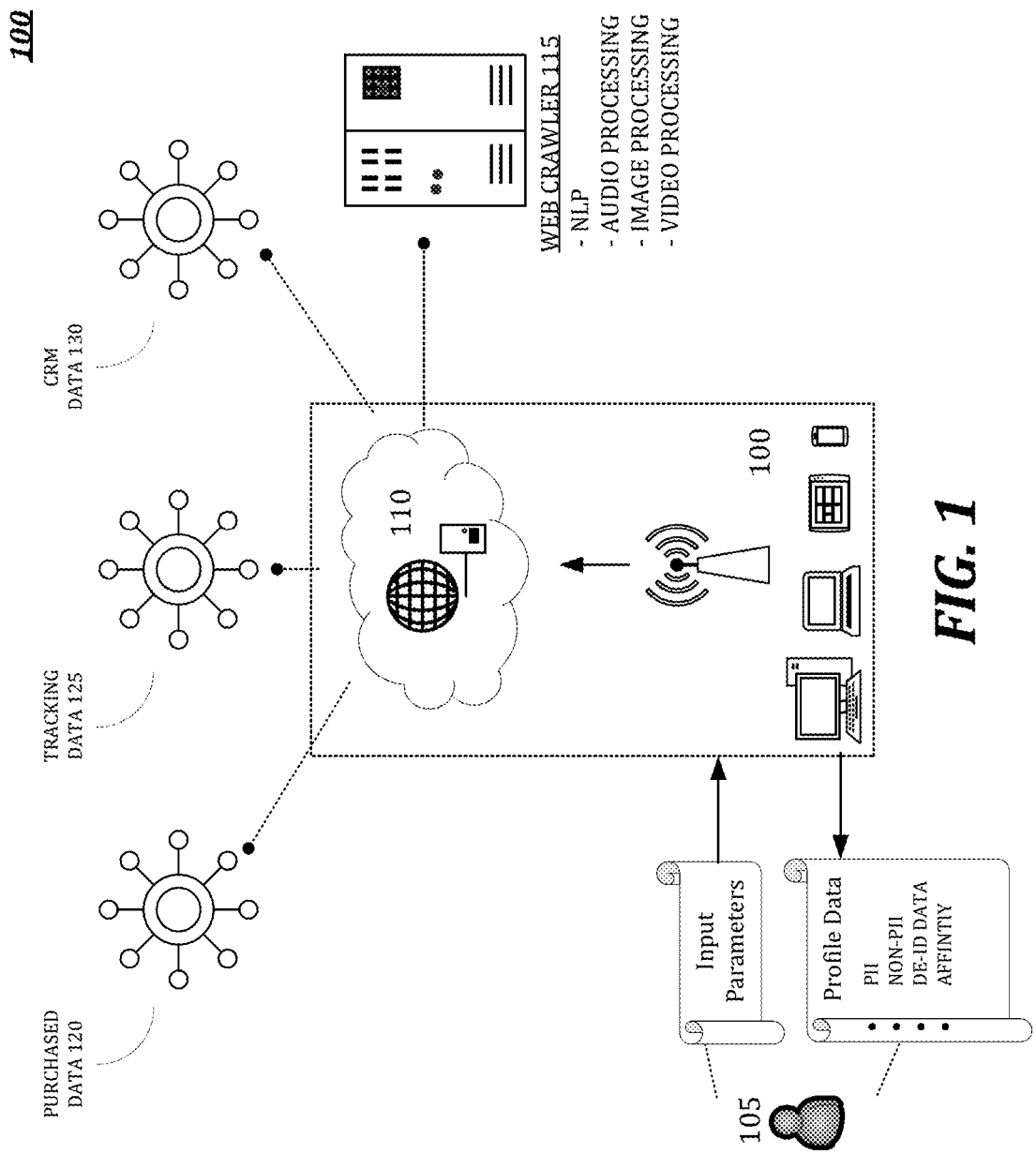
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of data mining for marketing purposes, embodiments of the present disclosure are not limited to use only in this context. For example, the platform may be used to study demographics, psychographics, market behavior, competitor affinity, and expanding markets. Moreover, embodiments of the present invention are not limited to data collected from internet tracking techniques. For example, the data may be integrated into call-centers, CRMs, and various other data sources.

I. Platform Overview

Consistent with embodiments of the present disclosure, a user profile creation platform may be provided. This overview is provided to introduce a selection of concepts in a simplified form that are further described below. This overview is not intended to identify key features or essential features of the claimed subject matter. Nor is this overview intended to be used to limit the claimed subject matter's scope.

A platform consistent with embodiments of the present disclosure may be used by individuals or companies to determine, with relative accuracy, statistics about individuals using the Internet and groups of such individuals. Such statistics may be used by the platform to predict, for example, but not limited to, an individual or group of individuals' personal and commercial behavior. As a non-limiting, illustrative example, the platform may be used by a washing machine company to, for example, determine which individuals are likely to be purchasing a new washing machine, and which brands they are most likely to purchase based on webpages that they visit.

Embodiments of the present disclosure may operate in a plurality of different environments. For example, in a first aspect, the platform may receive notice that an individual has visited a webpage. Then, the platform may crawl that page to gather raw data from the page. For example, the platform may use various algorithms, including, but not limited to, for example, natural language processing (NLP) and digital signal processing (audio/image/video data) to search the web page for key words or phrases.

Still consistent with embodiments of the present disclosure, the platform may receive raw data as it tracks individuals throughout, for example, an ad network or collection of ad networks. Tracking may include, for example, but not be limited to, a crawling of each visited webpage so as to create a profile for the page. As will be further detailed below, the profile may be generated by, for example, the aforementioned algorithms used to gather raw data for the page.

Accordingly, in some embodiments, interaction of a user with a plurality of servers, such as for example, content servers, ad servers and so on may be monitored. For instance, when the user visits a webpage provided by a server, a tracking cookie may be instantiated in order to save information regarding the user and/or the user's interaction with the webpage. For instance, the tracking cookie may be instantiated at the server side and may include information such as a timestamp corresponding to the user's visiting of the webpage and one or more identifiers associated with the user. The one or more identifiers may be for example, a network identifier such as an Internet Protocol (IP) number and/or a MAC number, a device identifier such as an IMEI number, a software environment identifier, such as OS name, browser name etc., user identifiers such as email address, first name, last name, middle name, postal address etc. and values of contextual variables such as GPS location of the device used to access the webpage, sensor readings of the device while accessing the webpage and so on.

In some embodiments, the one or more identifiers, such as the IMEI number, may uniquely identify the user while preserving anonymity of the user.

In other embodiments, the one or more identifiers may be subjected to encryption or a one way hashing in order to render the one or more identifiers unreadable to other users while maintaining the ability of the one or more identifiers to uniquely identify the user. For example, in some instances, tracking cookie may be instantiated on a client side, where the tracking cookie may reside on a user device, such as a smartphone or a laptop computer. Accordingly, any information collected by the tracking cookie may remain accessible in human readable form only within the user device. However, prior to transmitting the tracking cookie to the server side, the information collected may be subjected to hashing. Accordingly, in some embodiments, information about the user in human readable form may not be available at the server side. Thus, users may be ensured of preserving their privacy.

Further, in some embodiments, each of the plurality of servers may adopt a common hashing algorithm such that each of the plurality of servers may compute a common hash value for the one or more identifiers. Accordingly, when information in the tracking cookies from each of the plurality of servers is transmitted to the platform, the information collected by multiple tracking cookies may be identified as being associated with the same user based on the common hash value. Such a technique may allow tracking the user across multiple servers accessed by the user through a common user device.

In yet further embodiments of the present disclosure, the raw data may be from purchased data acquired by data aggregators. The raw data may include, for example, a plurality of device specific information (e.g., device serial number, IP address, and the like) along with a listing of websites accessed by the device. The platform may be enabled to identify a plurality of devices associated with a single individual and, subsequently, associated the data aggregated and processed for each device to a single individual profile.

For instance, in some embodiments, where the user may access the same and/or different servers through multiple user devices, a correlation of the information collected by the multiple cookies may be performed in order to track the user. In some cases, each of the multiple tracking cookies may not include all of the one or more identifiers. For example, the user may access a webpage of a server using a smartphone, while the user may access a webpage of another server using a laptop computer at work. Further, the laptop computer may include additional restrictions that forbid the tracking cookie from collecting some of the one or more identifiers. However, at least some of the information collected by the multiple cookies may still be common. Accordingly, by correlating information across the multiple tracking cookies, it may be ascertained that the multiple tracking cookies are associated with the same user. Further, in some embodiments, a threshold of correlation value may be established. Accordingly, the multiple tracking cookies may be determined to be associated with the user only if a correlation value exceeds the threshold.

Figure 12:
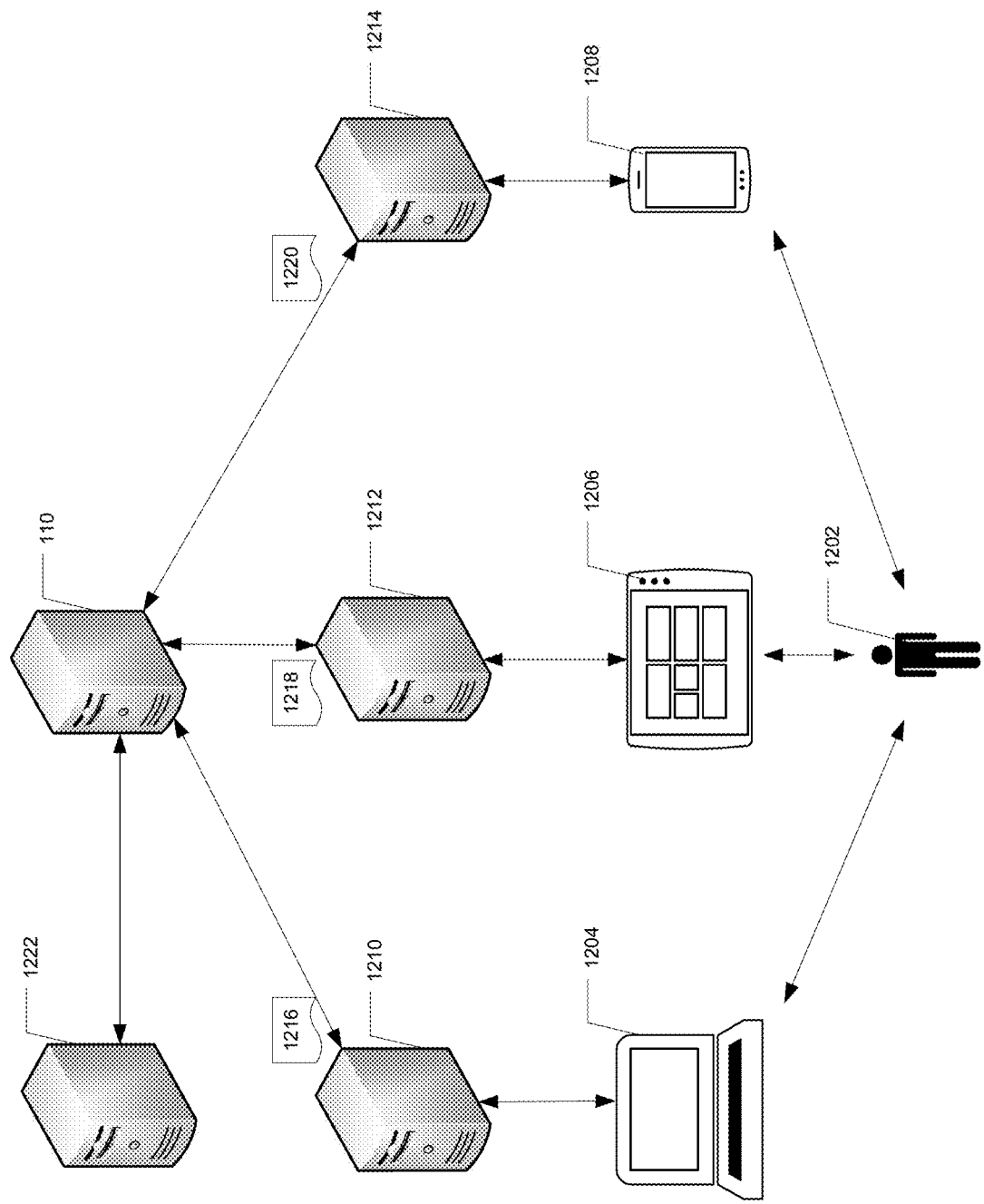
FIG. 12 illustrates aggregation of user behavior data of a user accessing webpages using different user devices in accordance with some embodiments.

For example, as shown in FIG. 12, a user 1202 may interact with laptop 1204 at workplace, a tablet 1206 at home and a smartphone 1208 while travelling in order to access different webservers such as webserver 1210, 1212 and 1214, respectively. Accordingly, when the user 1202 accesses a webpage hosted by webserver 1210 through the laptop 1204, a cookie 1216 may be instantiated at the webserver 1210. The cookie 1216 may contain information such as, a device number of the laptop 1204, a listing of URLs viewed by the user 1202 on the webserver 1210 and a user identifier.

The user identifier may be for example, an email address or a username corresponding to a social network. For instance, several websites require users to login using an existing account with another online service such as, Google+®, Facebook®, Twitter® etc. Accordingly, the user identifier stored in the cookie may correspond to one of the existing accounts of the user with an online service. Similarly, the cookie 1218 may contain information such as, a device number of the tablet 1206, a listing of URLs viewed by the user 1202 on the webserver 1212 and a user identifier. Likewise, the cookie 1220 may contain information such as, a device number of the smartphone 1208, a listing of URLs viewed by the user 1202 on the webserver 1214 and a user identifier.

In some cases, the user 1202 may access webpages on each of webserver 1210 to 1214 using the same user identifier, for example, an email address. Accordingly, each of cookies 1216 to 1220 may include the email address unique to the user 1202. Further, the platform 110 may be configured to receive the cookies 1216 to 1220 and detect presence of a common identifier, i.e. the email address of the user 1202 in each of the cookies 1216 to 1220. As a result, the platform may associate the cookies 1216 to 1220 with the same user 1202, even though the device number may vary across the cookies.

In some other cases, the user 1202 may access webpages on each of webserver 1210 to 1214 using different user identifiers. For instance, the user 1202 may access webserver 1210 using a Google+® username, webserver 1212 using a Facebook® username and webserver 1214 using a Twitter® username. Accordingly, cookies 1216 to 1220 may contain different user identifiers corresponding to the user 1202. However, the platform 110 may be configured to communicate with an identity server 1222 in order to determine association of each of the different user identifiers with the same user 1202. For example, the identity server 1222 may maintain association between a user and multiple online accounts subscribed by the user. Accordingly, the platform 110 may query the identity server 1222 in order to establish that each of cookies 1216 to 1220 correspond to the same user 1202.

Alternatively and/or additionally, in some embodiments, the platform 110 may be configured to determine a correlation between different user identifiers associated with the user 1202 by querying one or more webservers. For instance, a profile page of the user 1202 may include two or more user identifiers corresponding to different online services. For example, a LinkedIn® profile page may list out the Google+® username and the Facebook® username of the user 1202. Accordingly, the platform 110 may be configured to access the LinkedIn® profile page and detect the correlation between the different user identifiers. As a result, the platform may establish that each of cookies 1216 to 1220 correspond to the same user 1202.

The platform may then apply the aforementioned algorithms to process the websites accessed by the devices and, in this way, profile the websites as will be detailed below. The profiled website may then be used to characterize an individual who has been detected to access the profiled website. Moreover, and as will be further detailed below, the characterized individual data may then be grouped along with other individuals' data assessed by the platform in a plurality of ways including, but not limited to, geographic, household, workplace, interests, affinities, gender, age, and the like.

It should be understood that each individual analyzed by the platform of the present disclosure may be weighted with an 'affinity' of relationship to a particular category. For example, for those individuals who have visited websites profiled to be more 'female' friendly may be determined, by the platform, to be most likely a 'female' based on, either solely or at least in part, the individuals web-traffic of profiled webpages associated with the individuals tracked device.

As yet a further example, the platform may identify individuals that visit webpages that include the words "cell phone" and determine that the individuals may be more likely to be shopping for cell phones. Further, by counting the number of times the individuals visit webpages that have predominately iPhones versus webpages that have predominately Android phones, the likelihood that such individuals prefer one phone to the other may be assessed. The platform may group like users to create useful statistical data. For example, the platform may create groups of people that are most likely willing to purchase a specific product (e.g., cell phones, or, more specifically, Android smartphones).

Embodiments of the platform may further be used to enable a platform user (e.g., mobile telecommunications company) to better understand its target market. Accordingly, data that has been acquired, aggregated, and processed by the platform may be provided to the user. For example an application program interface (API) may provide statistics about single individuals (e.g., likelihood that an individual prefers Android phones to iPhones), or groups of individuals (e.g., which individuals prefer Android phones to iPhones). Such statistics may be provided in, for example, lists, charts, and graphs. Further, searchable and sortable raw data may be provided. In some embodiments, the data may be provided to licensed users. For instance, users that have identified data such as, AT&T, which has a list of known individuals, may use the data to, for example, further market to their known list of individuals or predict churn.

In some embodiments, the processed data may be provided to the user as a plug-in. For example, if an individual logs into a website for the first time (e.g., Home Depot), the website owner may be able to customize the display for the first-time individual. In other embodiments, the platform may integrate with a customer relationship module (CRM). In this way, the CRM may be automatically updated with processed data for individuals in the CRM.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. By way of non-limiting example, a platform 100 may be hosted on a centralized server 110, such as, for example, a cloud computing service. A user 105 may access platform 100 through a software application. The software application may be embodied as, for example, but not be limited to, a website, a web application, a desktop application, and a mobile application compatible with a computing device 1100. One possible embodiment of the software application may be provided by Clickagy, LLC.

As will be detailed with reference to FIG. 11 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

A user 105 may provide input parameters to the platform. For example, input parameters may be certain device IDs. As another example, input parameters may include individuals living in Atlanta, GA Input parameters may be passed to server 110. Server 110 may further be connected to various databases, such as, for example, purchased data 120, tracking data 125 and CRM data 130. In some embodiments, the CRM may be associated with the user. For example, user's CRM database may interface with the platform.

Information relevant to individuals associated with the input parameters, such as, for example, which websites they visited, may be sent to web crawler 115. Web crawler 115 may search webpages and online documents visited by individuals being tracked and gather data associated with the searched webpages and online documents. For example, web crawler 115 may utilize natural language processing and audio, video and image processing to gather information for websites. Web crawler 115 may further perform algorithms and build profiles based on webpages and online documents being searched, such as, for example, constructing 'affinities' for websites (further discussed below). Information and website and online document profiles being tracked may be passed back to server 110. Server 110 may further construct profiles for individuals being tracked and groups of individuals being tracked. The individual and group profiles as well as further data (e.g. personally identifiable information (PII), non-PII, de-identified data and website/individual/group affinity) may be returned to user 105.

User 105 may then use the returned data. For example, user 105 may merge the individual and group profiles with their own data. In some embodiments, user 105 may license the data to other individuals or companies. In further embodiments, user 105 may receive data in a visual form, such as, for example, on a dashboard containing tables, graphs, and charts summarizing the data. In some embodiments, received data may be integrated with a user CRM database. Further, in some embodiments, the received data may be utilized by an API. For example, a plug-in may utilize the received data for identifying individuals (and their associated information, affinities and preferences) that visit a user's website for the first time.

III. Platform Operation

Figure 2:
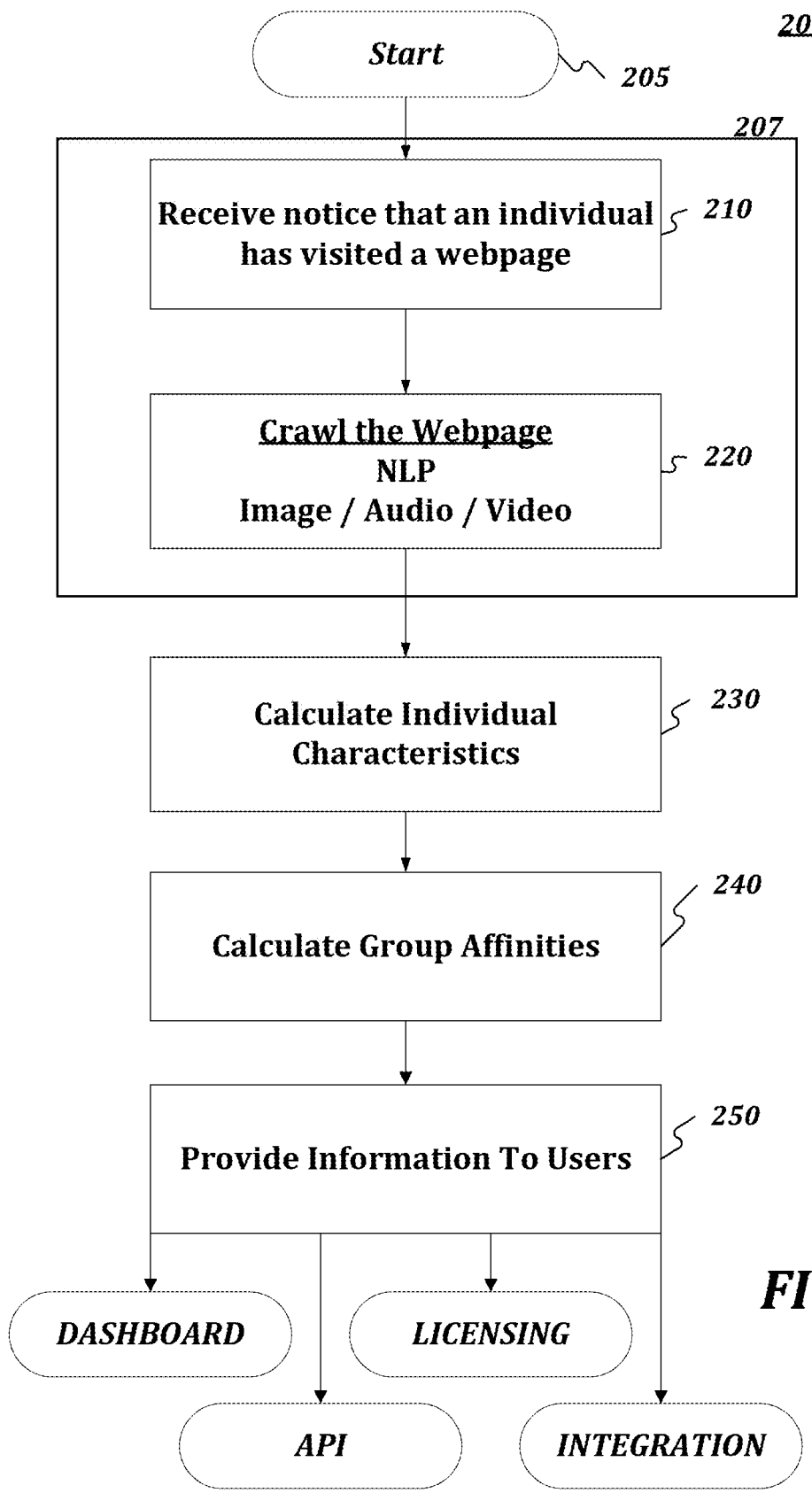
FIG. 2 is a flow chart of a method for providing a user profile creation platform.

FIG. 2 is a flow chart setting forth the general stages involved in a methods 200 and 700A to 700C consistent with an embodiment of the disclosure for providing a user profile creation platform 100. Methods 200 and 700A to 700C may be implemented using a computing device 1100 as described in more detail below with respect to FIG. 11.

Although methods 200 and 700A to 700C have been described to be performed by platform 100, it should be understood that computing device 1100 may be used to perform the various stages of methods 200 and 700A to 700C. Furthermore, in some embodiments, different operations may be performed by different networked elements in operative communication with computing device 1100. For example, server 110 may be employed in the performance of some or all of the stages in methods 200 and 700A to 700C. Moreover, server 110 may be configured much like computing device 1100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 200 and 700A to 700C will be described in greater detail below.

Method 200 may begin at starting block 205 and proceed to stage 210 where platform 100 may receive data from an individual's internet use. For example, the platform may receive information about a webpage that the individual visited or a Microsoft Word document or PDF that an individual downloaded. Information may include the URL of the webpage. Further information may be received, including IP address of the individual, search history of the individual, and geolocation of the individual.

From stage 210, where platform 100 receives data from an individual's Internet use, method 200 may advance to stage 220 where platform 100 may further gather information associated with the individual's Internet use. For example, the platform may crawl the webpage that the individual visited. For example, the platform may search for specific key words or phrases. In some embodiments, if the webpage has already been crawled, the webpage may be skipped.

Figure 3:
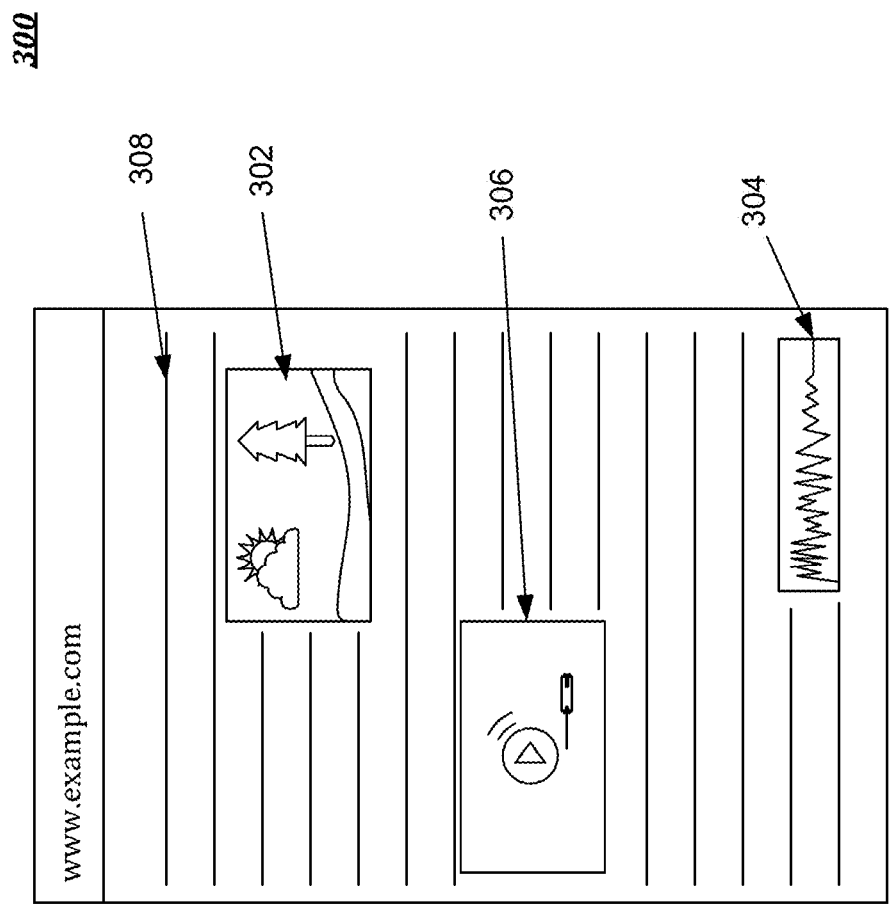
FIG. 3 illustrates example 300, showing how NLP, image, video and audio information may be acquired to provide the individual's Internet use information.

During the crawl, the platform may perform, for example, natural language processing (NLP) to further process the context of the words and phrases in the text. In addition, the platform may utilize image recognition, audio recognition, and/or video recognition to gather data about the individual's Internet use. FIG. 3 illustrates example 300, of a webpage "www.example.com" showing how NLP, image, video and audio information may be acquired to provide the individual's Internet use information. For example, images 302 may be scanned with optical character recognition (OCR). The OCR scanning may generate words or phrases for characterizing the webpage. Further, image recognition software may be used to characterize the webpage. For example, artificial intelligence (AI) software may be used to determine whether an image 302 is showing for example, a dog or a tree. Audio files 304 from the webpage may be scanned, using, for example, voice recognition software, to further provide information to characterize the webpage. Video files 306 from a page may be converted to a series of images from periodic individual frames and scanned in the same manner as an image. In addition, the audio associated with the video files 306 may be scanned to provide data about the webpage. Likewise, text 308 from the webpage may also be extracted and analyzed based on NLP. The combination of text, image, audio and video recognition may provide a human-style "view" of what the webpage provides. The human-style "view" may enable the platform to optimize characterization of the webpage.

Information that is acquired from the crawl may further be associated with how recently such information was associated with the webpage (e.g., newer information may be given a higher relevance than older information). The platform may receive further information, for example, that is purchased from various data aggregators (e.g., aggregators that track specific IDs.) In addition, information may be tracked from an existing individual base. For example, if the individual clicks ("I Agree") on certain terms and conditions, the platform may place a tracking cookie on the individual's device to further gather information. In some embodiments, stages 210 and 220 may comprise 207, where platform 100 receives general data. The general data may include, for example, data from webpages (e.g., text, image, audio, and video data associated with the webpage) and data from individuals (e.g., which websites the individuals have visited, information from the individuals' social media profiles, and the like).

Once platform 100 further gathers information associated with the individual's Internet use in stage 220, methods 200 and 700A to 700C may continue to stage 230 where platform 100 may analyze the information. In some embodiments, the platform may perform natural language processing (NLP) as well as image, audio and video recognition to analyze the information. For example, the platform may use specific keywords and phrases, as well as keywords associated with image, video and audio files, found on each webpage and attach a plurality of 'affinities' to each page. For example, for a news article about iPhones, the platform may return hundreds of 'keywords', including "Apple" with 94% affinity, "cell phone" with 81% affinity, and "screen" with 52% affinity. The platform may then interpret the information based on the individual's Internet use to create a profile associated with the affinities.

For example, an individual may visit a number of webpages that have high affinity for keywords like "truck", "football", and "Scotch". Such an individual may be statistically more likely to be a male. As another example, another individual may visit a number of webpages that have high affinity for keywords like "nail polish", "Midol", and "Pinterest." Such an individual may be statistically more likely to be female. Such statistical predictions may be associated with a confidence level. Further, statistical predictions may be made for an abundance of other characteristics, such as, for example, but not limited to, age, marital status, parental status, approximate household income, industry of employment, sport preference, automobile preference, and phone preference.

Figure 4:
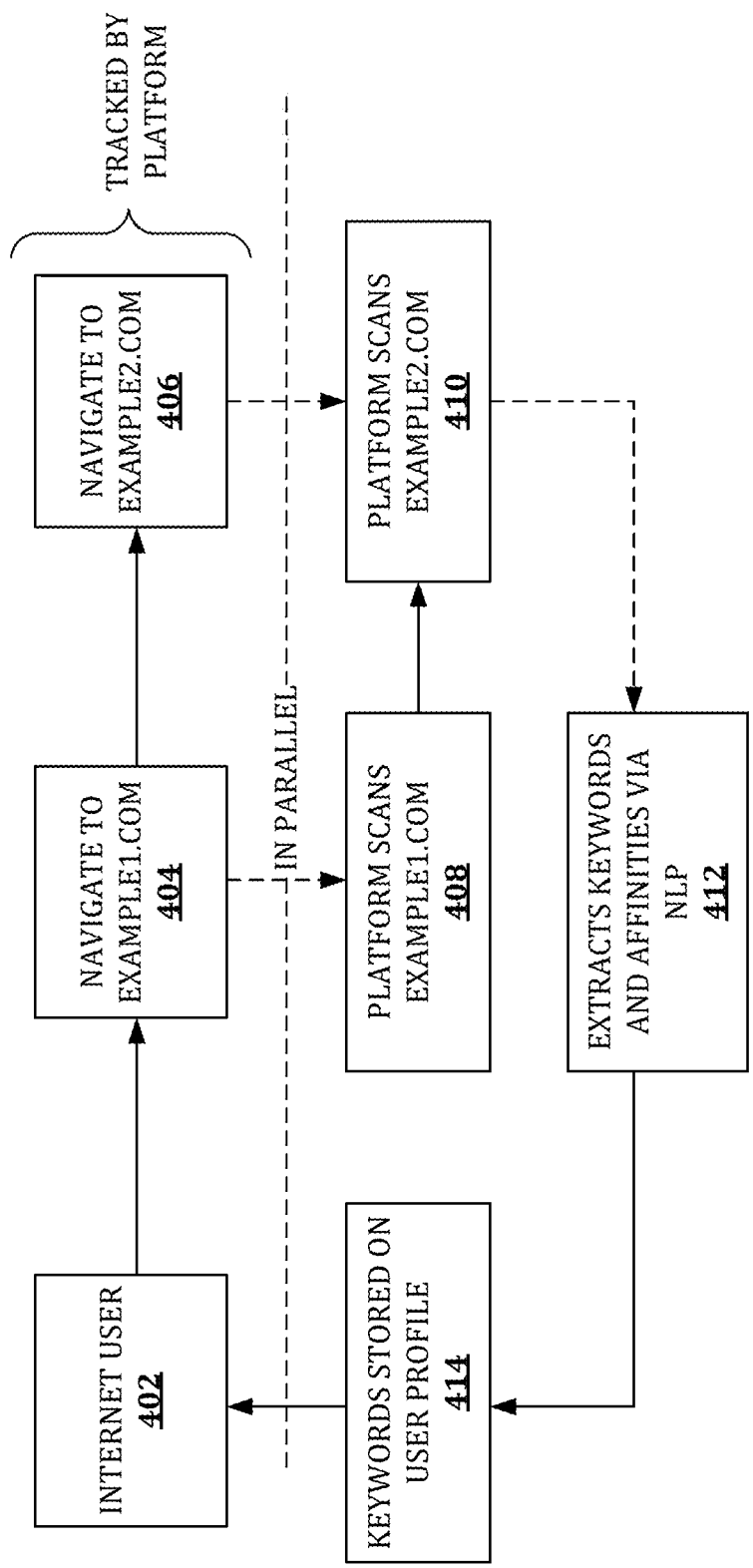
FIG. 4 illustrates an example 400 of how the platform may search an individual's search history.

FIG. 4 illustrates an example 400 of how the platform may search an individual's search history. The platform may track the internet user 402 who may visit multiple websites such as www.example1.com and www.example2.com at the same or different time instants, illustrated as steps 404 and 406 respectively. Accordingly, the platform may scan each of the webpages visited by the internet user 400, illustrated as steps 408 and 410. In some instances, the scanning of the webpages by the platform may be performed in parallel. Alternatively, the platform may scan each of the multiple webpages in a sequential manner and/or a combination of parallel and sequential scanning. Accordingly, keywords and corresponding affinities may be extracted based on analysis, such as NLP, illustrated as step 412. For example, content from the webpage such as textual content and non-textual content may be extracted. Further, non-textual content such as images, audio and video may be converted to textual content using one or more processes such as optical character recognition, speech recognition, image processing and so on. Subsequently, the textual content may be analyzed based on NLP in order to identify the keywords and associated affinities which may then be stored as the user profile at step 414 and associated with the internet user.

Figure 5:
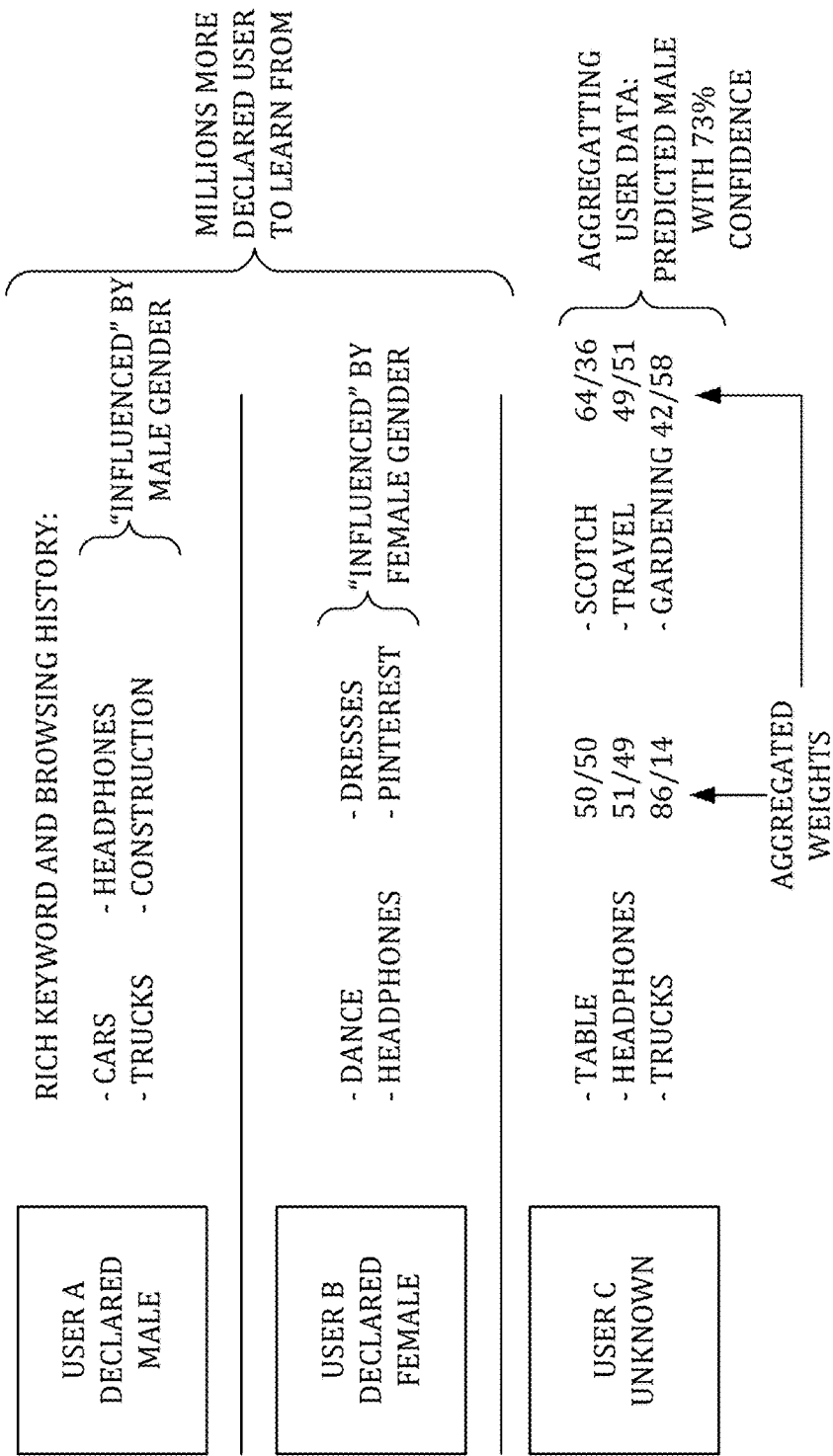
FIG. 5 illustrates an example 500 of how an individual may be associated with certain characteristics.

FIG. 5 illustrates an example 500 of how an individual may be associated with certain characteristics.

After platform 100 analyzes the information for each individual in stage 230, methods 200 and 700A to 700C may proceed to stage 240 where platform 100 may group users based on certain characteristics. For example, individuals likely to be of a certain characteristic, such as, for example, gender, age, marital status, parental status, approximate household income, and industry of employment, may be grouped together. Additionally, individuals may be grouped together based on their preferences, such as, for example, sport preference, automobile preference, and phone preference.

Further, in some embodiments, the platform may be configured to predict a first part of a first profile corresponding to a first user based on a first part of the second profile corresponding to a second user. Additionally, the predicting may be based on a result of a comparison between a second part of the first profile and a second part of the second profile.

Accordingly, a profile of a user may further include one or more characteristics of the user, such as for example, a demographic characteristic such as gender. Accordingly, in some embodiments, the first part may include one or more characteristics of the first user. Further, the second part may include at least one keyword and one or more corresponding affinity values. Accordingly, based on a match of keywords and affinity values of the first user and that of the second user, one or more characteristics, such as demographic characteristics, of the second user may be predicted based on the one or more characteristics of the first second user. In other words, based on a match of keywords and/or affinity values between two users, one or more characteristics of one user may be associated with the other user.

Additionally, in some embodiments, the first part may include one or more keywords and one or more corresponding affinity values. Further, the second part may include one or more characteristics of the first user. Accordingly, based on a match of one or more characteristics of the first user and that of the second user, one more keywords and/or corresponding affinity values of the second user may be predicted based on one or more keywords and/or corresponding affinity values of first second user. In other words, based on a match of, for example, demographic characteristics between two users, keywords and/or corresponding affinity values of one user may be associated with the other user.

Further, in some embodiments, a result of comparison of a keyword and a corresponding affinity value corresponding to each of the first user and the second user may be associated with a confidence value. Additionally, the predicting may be associated with an aggregated confidence value computed based on aggregating confidence values corresponding to each keyword and corresponding affinity value of a plurality of keywords and corresponding affinity values.

For instance, as illustrated in FIG. 5, each of User A and User B may be associated with a demographic characteristic such as gender. In some instances, each of User A and User may declare corresponding gender. Accordingly, User A may be known to be a Male while User B may be known to be a Female. Further, each of User A and User B are associated with a user profile including keywords. As shown, User A may be associated with keywords influenced by Male gender such as, cars, trucks, headphones and construction. Similarly, User B may be associated with keywords influenced by Female gender such as, dance, headphones, dresses and Pinterest.

Accordingly, each of User A and User B may be instances of the first user. Further, the first part of the profile associated with User A and User B may include the gender. Furthermore, as shown, a User C may be an instance of the second user whose gender may be initially unknown. However, keywords and/or affinity values corresponding to the User C may be available. Accordingly, in an instance, keywords associated with the User C may be compared with keywords associated with each of User A and User B. A result of the comparison may indicate a greater degree of match between User C and User A. In other words, User C's online behavior may be more similar with that of User A than that of User B. Accordingly, it's more likely that User C may be associated with similar characteristics, such as gender, as that of User A. Consequently, User C may be determined to be of Male gender.

Similarly, in some instances, a characteristic of a user, such as gender, may be predicted based on a match between interests of the user and interests of groups of other users with known information, such as gender. For example, by aggregating keywords and/or affinity values of declared males, a first set of keywords may be identified that indicate interests predominantly influenced by the male gender. Similarly, a second set of keywords that indicate interests predominantly influenced by the female gender may be identified by aggregating keywords and/or affinity values of declared females. Accordingly, when a user with unknown gender is encountered by the platform, keywords associated with the user may be compared with each of the first set of keywords and the second set of keywords. Further, based on a number of matches, the gender of the user may be predicted. For example, if five of the most important keywords associated with the user are matched with the first set of keywords while only two of the most important keywords matched with the second set of keywords, the platform may predict the user to be of male gender.

Further, keyword in the user profile of the User C may be associated with a confidence value in relation to the one or more characteristics being predicted. For instance, as shown, each keyword in User C's profile is associated with confidence values in the form of a pair of numbers. For example, the keyword table is associated with "50/50" indicating that the confidence with which "table" indicates a Male gender is identical to the confidence with which "table" indicates a Female gender. Similarly, the keyword trucks is shown to be associated with the confidence values 86/14 indicating that the confidence with which "truck" indicates a Male gender is greater than the confidence with which "truck" indicates a Female gender.

In some embodiments, the confidence values may be derived based on statistical analysis of keyword and/or corresponding affinity values of a large group of individuals comprising both Males and Females. For instance, statistical analysis may indicate that a keyword such as "Scotch" was found to be associated with a user declared as Male in 64% of user profiles analyzed while the same keyword was found to be associated with a user declared as Female in 36% of user profiles analyzed.

Additionally, in some embodiments, the aggregated confidence value may be computed based on aggregating confidence values corresponding to each keyword and corresponding affinity value of a plurality of keywords and corresponding affinity values. For instance, as illustrated in FIG. 5, confidence values associated with each of the keywords may be aggregated to compute the aggregated confidence value, such as for example, 73%.

Further, in some embodiments, by aggregating keywords and/or affinity values across large groups of users, an accuracy of predicting an unknown characteristic of an individual may be enhanced. For instance, consider a case where the individual is compared to a single user whose profile comprises of 150 keywords. Further, only two keywords out of the 150 keywords may have strong gender influence. Accordingly, the individual may be predicted to be a female with a confidence value of 60%.

On the other hand, consider the case where the individual is compared to a group of 100 k users who visited the webpage delta.com yesterday. Some of these users may have denser profiles with tens of thousands of keywords, while others may have profiles that may be sparser with 10-100 keywords each. By combining keywords and/or affinity values of all these users into a group, a large number, such as 50 million, of keywords may be obtained. Out of these, thousands may have strong gender biases. Further, suitable mathematical functions may be applied to the group to balance against the keywords per person and mitigate skews. Subsequently, based on a comparison of the individual's keywords and/or affinities with that of the group's keywords and/or affinities, a prediction of the individual's gender may be determined with a higher confidence value, such as 83%. Further, since this is a group, the platform may determine with relatively high confidence that 17% of the users visiting delta.com yesterday were female, and 83% were male.

Figure 6:
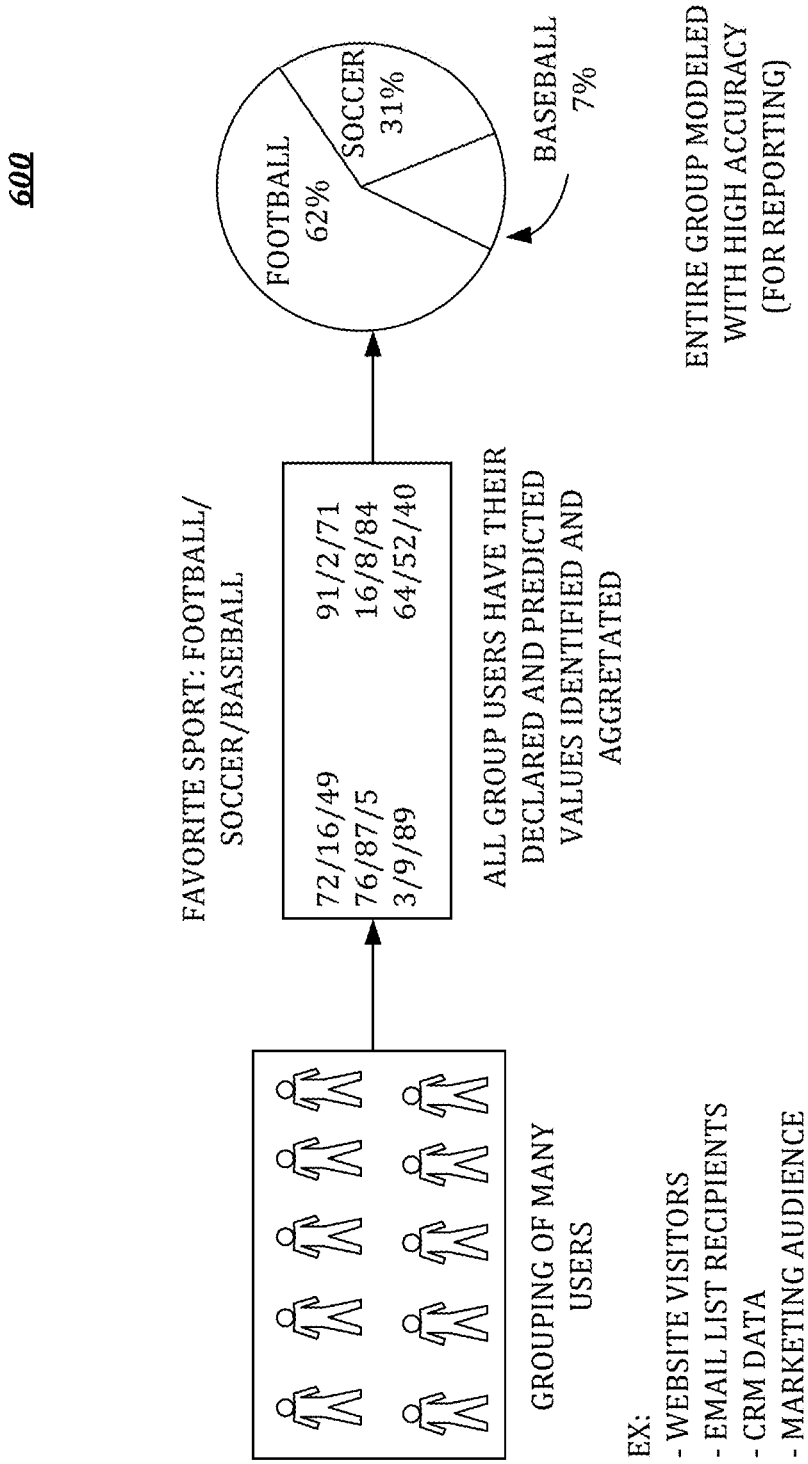
FIG. 6 illustrates an example 600 of how individuals may be grouped. Using logic functions (e.g., AND, OR, and NOT), individuals of a specific type may be grouped and sorted.

FIG. 6 illustrates an example 600 of how individuals may be grouped. Using logic functions (e.g., AND, OR, and NOT), individuals of a specific type may be grouped and sorted. Further, in some embodiments, individuals may be aggregated using statistical functions such as, for example, weighted averages. Accordingly, a group profile corresponding to a plurality of users may be created. Further, the group profile may include a plurality of keywords and a corresponding plurality of group affinity values. A group affinity value of a keyword may be based on aggregation of affinity values of the keyword associated with the plurality of users. For instance, as shown, the plurality of users may correspond to a group of website visitors, list of email recipients, marketing audience, paying customers and so on.

Further, each user may be associated with a user profile comprising keywords, corresponding affinity values and one or more other characteristics such as demographic characteristics. Additionally, in some embodiments, one or more of keywords, corresponding affinity values and demographic characteristics may be determined based on analysis of the webpages visited by the users and/or based on prediction as explained in conjunction with FIG. 5. For instance, affinity of users to each sport such as, football, soccer and baseball, illustrated as triplets of numbers as shown, may be either determined and/or predicted. Accordingly, by aggregating the affinity values for each sport across all users of the group, group affinity values may be obtained for each sport as shown. As a result, user groups may be modeled with greater accuracy for reporting purposes.

Figure 7A:
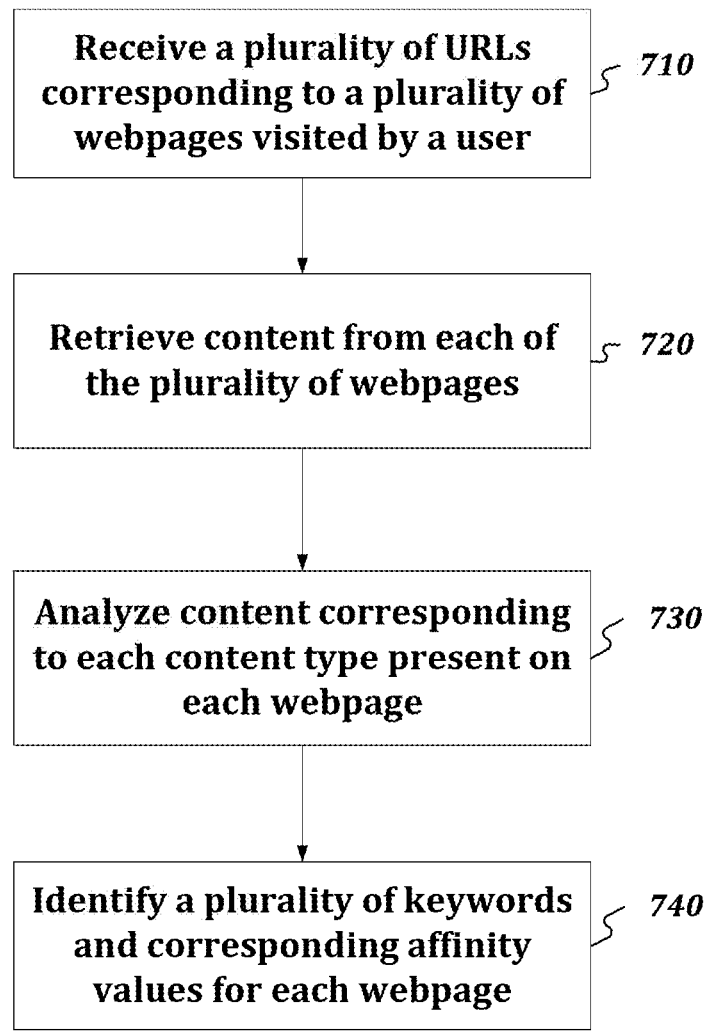
FIG. 7A illustrates a method 700A of creating a user profile including keywords and associated affinity values based on user behavior in accordance with some embodiments.
Figure 8:
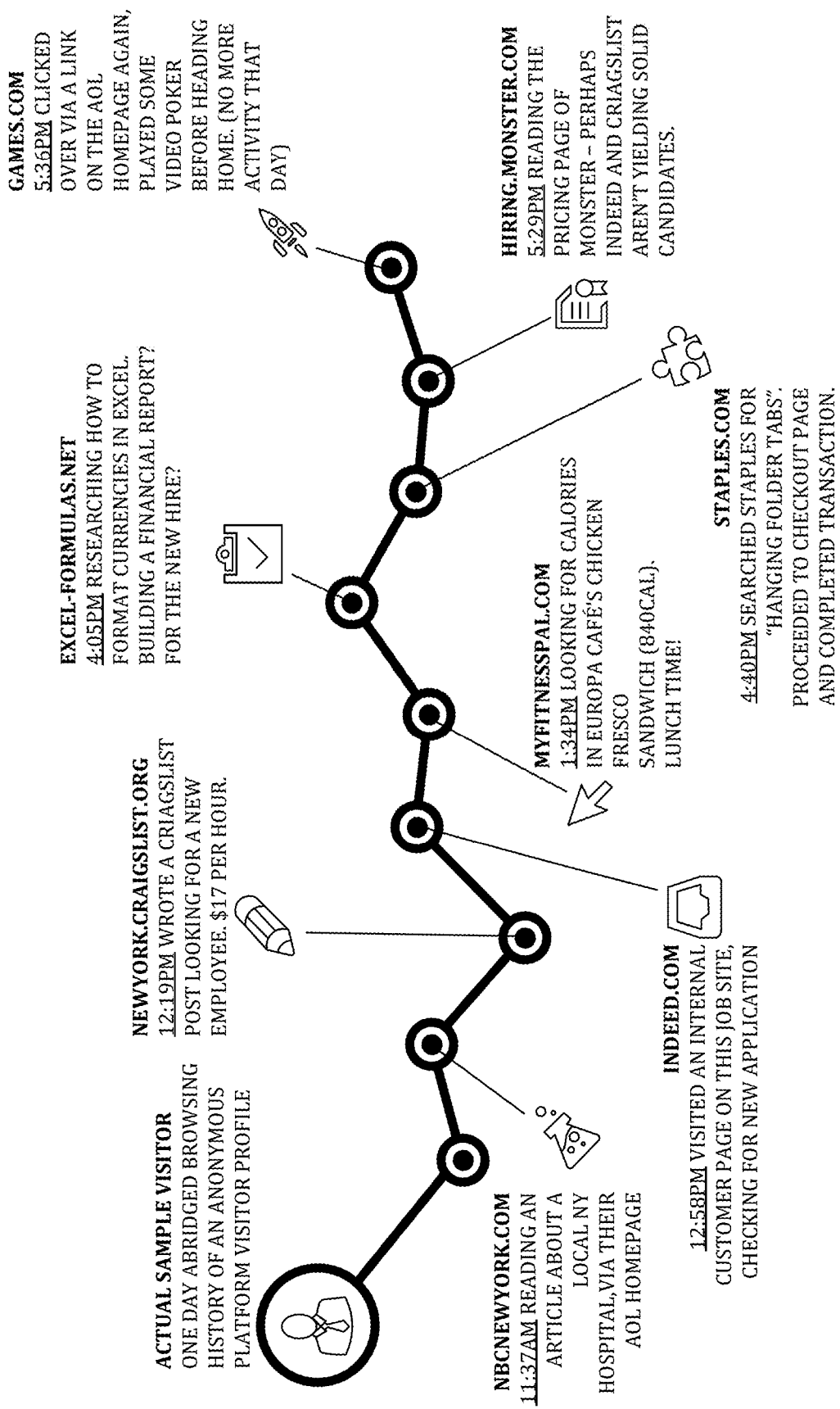
FIG. 8 illustrates an online user behavior of a user based on which a user profile may be created in accordance with some embodiments.

Further, according to some embodiments, a computer implemented method, such as method 700A, of creating a profile of a user based on user behavior may be provided as illustrated in FIG. 7A. The user behavior may include for example, online activity performed by the user such as viewing webpages, online shopping, downloading content from the internet, uploading content to the internet and interacting with a desktop application and/or a mobile application. As an example, online user behavior data based on which the user profile may be created is illustrated in FIG. 8.

Further, in some embodiments, data representing the user behavior may be de-identified. In other words, data representing the user behavior may not include identifiable information such as name, phone number, postal address, bank account number and so on. Accordingly, privacy of users may be preserved. For instance, data representing the user behavior may include a list of URLs visited by the user and a corresponding list of times when the user accessed the URLs.

In order to create the user profile, the method may include a step 710 of receiving a plurality of Universal Resource Locators (URLs) corresponding to a plurality of webpages visited by the user. Further, the method may include a step 720 of retrieving content from each of the plurality of webpages based on the plurality of URLs. For instance, a crawler program may be executed on a processor to automatically retrieve content from each of the plurality of webpages by accessing the plurality of URLs.

Subsequent to retrieving the content, the method may include a step 730 of analyzing the content from each of the plurality of webpages. In some embodiments, analyzing content from a webpage may include analyzing content corresponding to each content type present on the webpage. For example, both textual content and non-textual content such as audio, images, video and multimedia on the webpage may be analyzed.

Further, in some embodiments, the analyzing may include performing Natural Language Processing (NLP) of a textual content in the webpage. Additionally, in some embodiments, in case the webpage consists of non-textual content, a step of converting the non-textual content into textual content may be performed. Subsequently, the NLP may be performed on the converted content.

Figure 10:
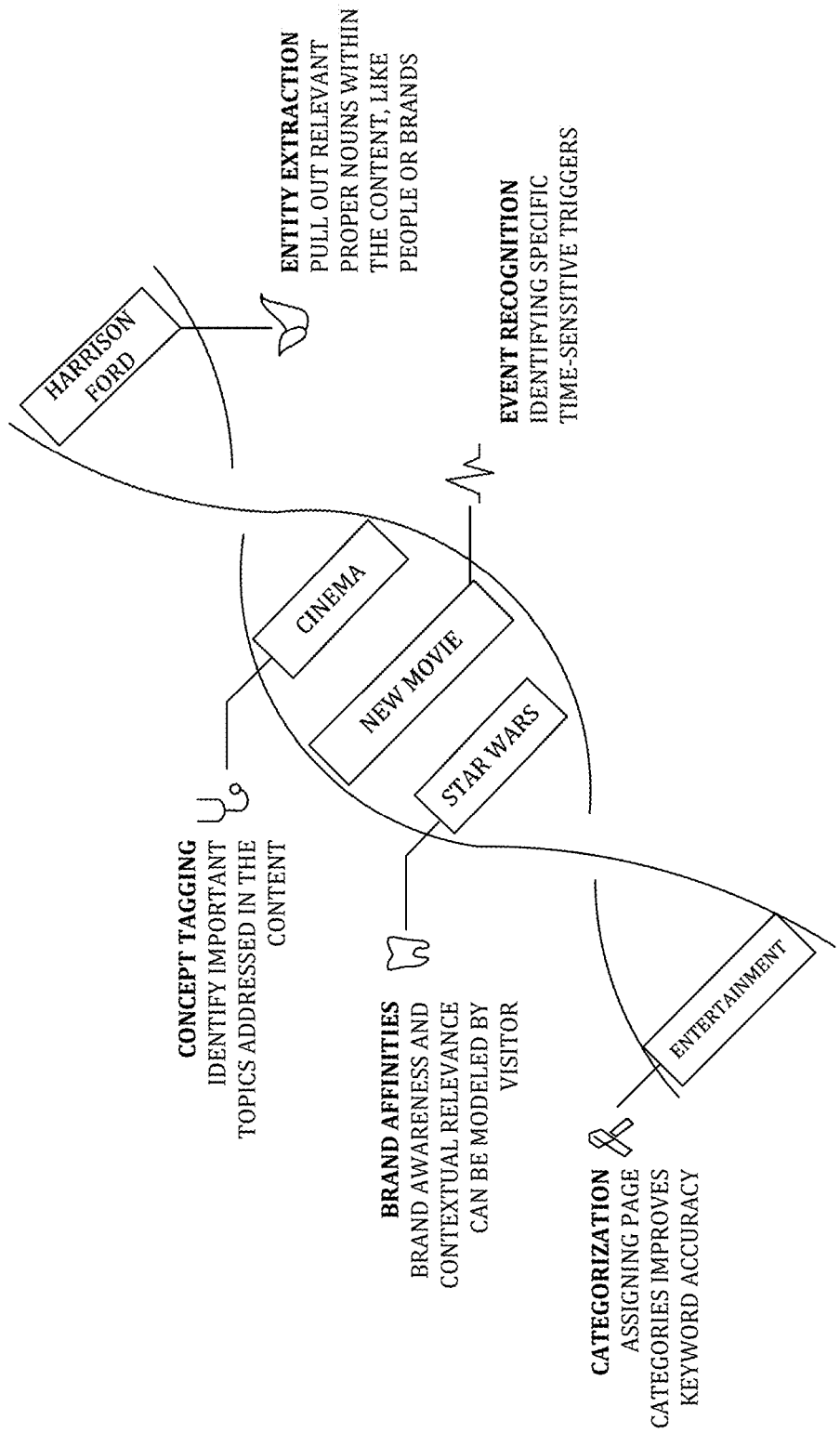
FIG. 10 illustrates Natural Language Processing performed on data extracted from webpages visited by a user based on which a user profile may be created in accordance with some embodiments.

For instance, as illustrated in FIG. 10, analyzing content of the webpage using, for example, NLP may result in identification of a category of content, such as "Entertainment". Further, NLP may also identify brand affinities of the webpage, such as for example, "Star Wars" that may provide a greater contextual relevance and brand awareness to users. Additionally, NLP may also include event detection involving identification of specific time-sensitive triggers, such as for example, an upcoming "New Movie". Further, NLP may also identify important topics addressed in the content of the webpage and associate those topics as concept tags with the webpage, such as for example, "Cinema". Further, NLP may also include entity extraction involving identifying relevant proper nouns like people and/or brands.

Figure 9:
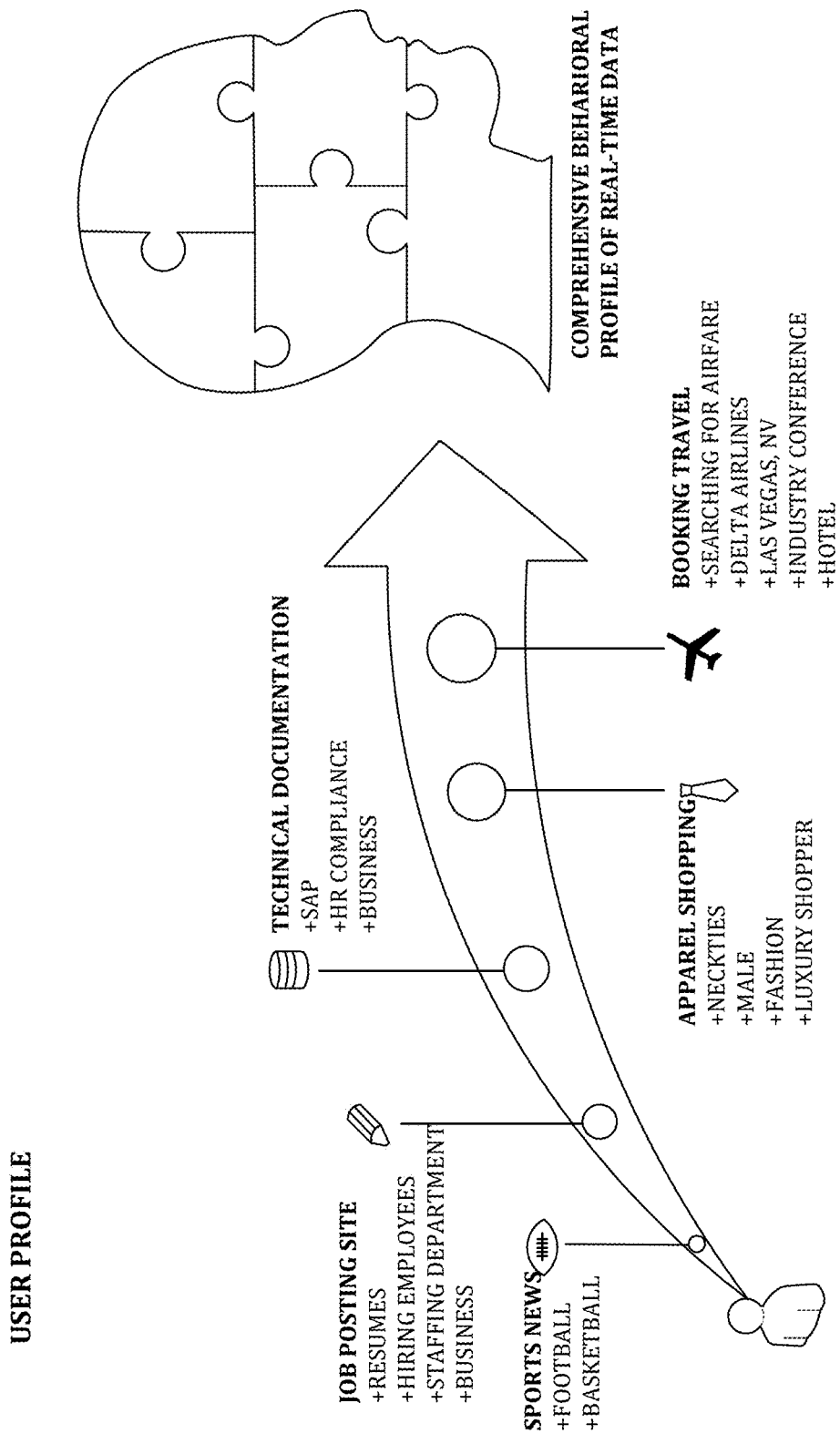
FIG. 9 illustrates an exemplary comprehensive user browsing data based on which a user profile may be created in accordance with some embodiments.

Additionally, the method may include a step 740 of identifying a plurality of keywords corresponding to the webpage based on the analyzing. For instance, an exemplary set of keywords identified for a user based on the user's interaction with various webpages is illustrated in FIG. 9. For example, based on the user's visiting of a webpage related to sports news, the keywords "Football" and "Basketball" may be identified and associated with the user.

Furthermore, the plurality of keywords may be associated with a plurality of affinity values. The plurality of keywords and the plurality of affinity values may constitute the profile of the user. For instance, an affinity value of the keyword on a webpage may represent how strongly the content of the webpage relates to the keyword. In other words, the affinity value may represent a relative importance of the keyword in the content. Accordingly, in some instances, keywords that appear either in important sections of the webpage such as title, abstract, sub-headings, table of contents, index, main image and so on may be associated with a relative larger affinity value as compared to those keywords that appear elsewhere in the webpage. Likewise, keywords that appear often within the content of the webpage may be associated with a relatively larger affinity value as compared to those keywords that appear only once or a few times. Additionally, keywords that may appear in different media types present on the webpage, such as text, image and audio/video may be associated with an even higher affinity value.

Figure 7B:
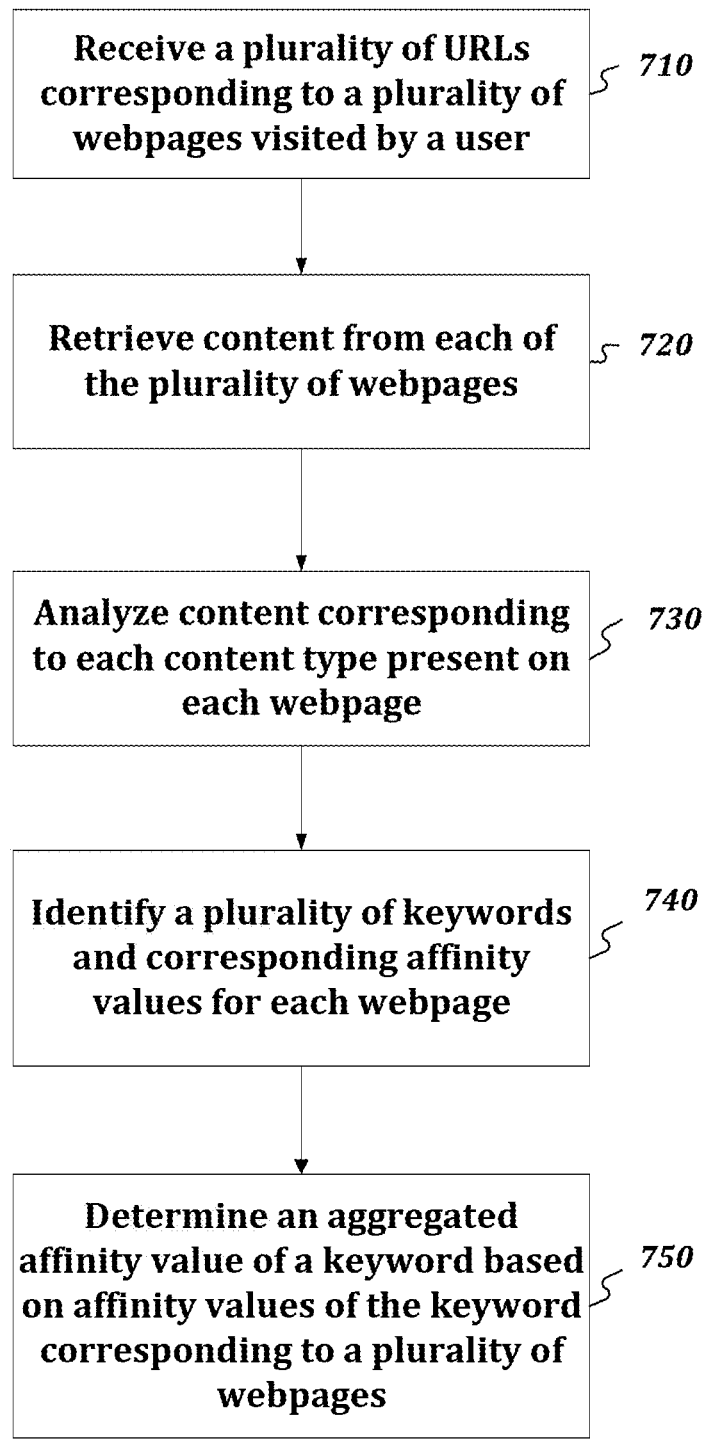
FIG. 7B illustrates a method 700B of creating a user profile including keywords and aggregated affinity values based on user behavior in accordance with some embodiments.

Further, in some embodiments, as illustrated in FIG. 7B, the method may further include a step 750 of determining an aggregated affinity value corresponding to a keyword based on a first affinity value of the keyword corresponding to a first webpage and a second affinity value of the keyword corresponding to a second webpage. In other words, the aggregated affinity value may represent an overall affinity of the keyword to the user based on the user's interaction with a plurality of webpages containing the keyword.

Further, in some embodiments, the aggregated affinity value may further be based on a time decay value associated with each of the first affinity value and the second affinity value. For instance, each of the first affinity value and the second affinity value may be weighted based on a time decay value. Accordingly, an impact of an affinity value on the aggregated affinity value may be controlled according to for example, a "freshness" associated with the affinity value. For instance, an affinity value of the keyword associated with a first webpage visited a week ago may be weighted more than an affinity value of the keyword associated with a second webpage visited a month ago.

Figure 7C:
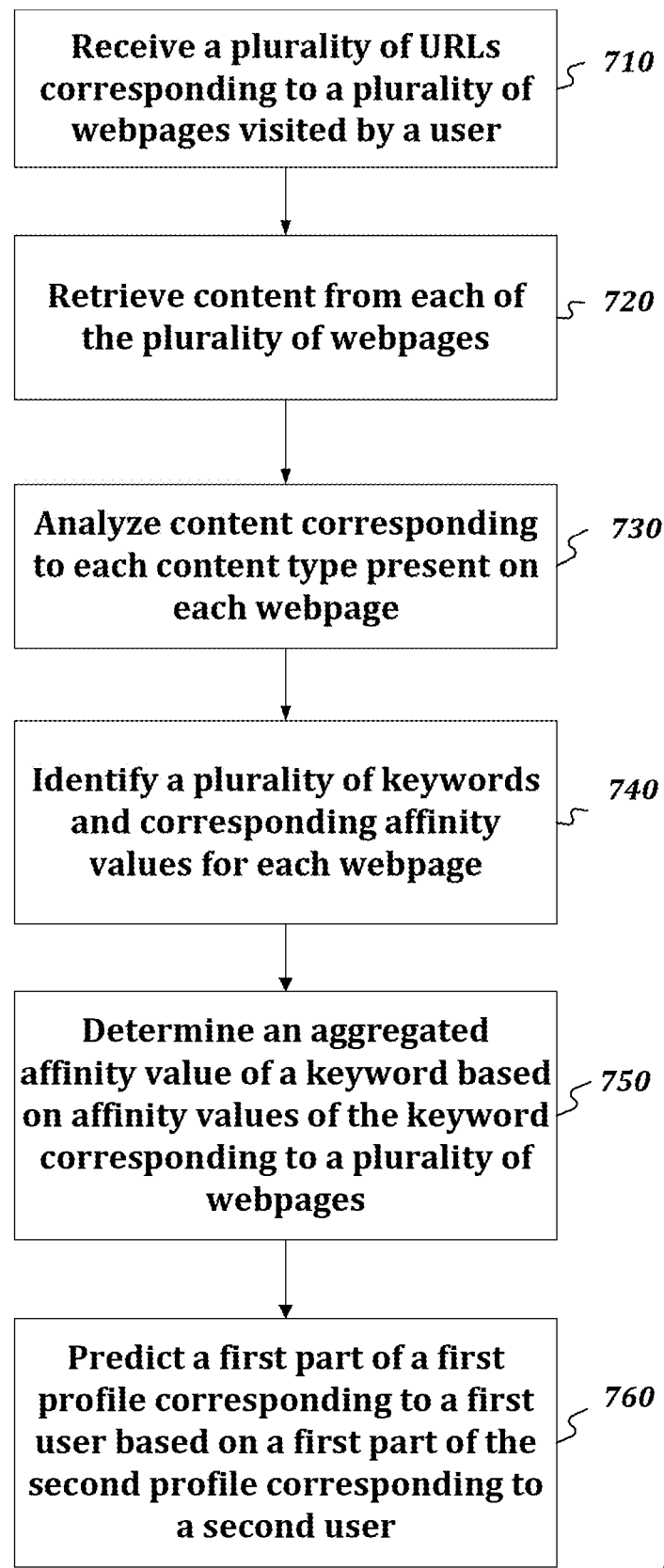
FIG. 7C illustrates a method 700C of predicting a portion of a user profile including keywords and aggregated affinity values in accordance with some embodiments.

Accordingly, the time decay value, in some embodiments, may take into account the dynamic nature of user interests. In other words, keywords from webpages visited a day ago may represent a current interest of a user which may be stronger than a past interest represented by keywords from webpages visited a month ago. Consequently, affinity values corresponding to these keywords may be weighted relatively higher in relation to those of keywords from webpages visited a month ago. Further, in some embodiments, as illustrated in FIG. 7C, the method 700C may further include a step 760 of predicting a first part of a first profile corresponding to a first user based on a first part of the second profile corresponding to a second user. Additionally, the predicting may be based on a result of a comparison between a second part of the first profile and a second part of the second profile.

Accordingly, a profile of a user may further include one or more characteristics of the user, such as gender. Accordingly, in some embodiments, the first part may include one or more characteristics of the first user. Further, the second part may include at least one keyword and one or more corresponding affinity values. Accordingly, based on a match of keywords and affinity values of the first user and that of the second user, one or more characteristics, such as demographic characteristics, of the second user may be predicted based on the one or more characteristics of the first second user. In other words, based on a match of keywords and/or affinity values between two users, one or more characteristics of one user may be associated with the other user.

Additionally, in some embodiments, the first part may include one or more keywords and one or more corresponding affinity values. Further, the second part may include one or more characteristics of the first user. Accordingly, based on a match of one or more characteristics of the first user and that of the second user, one more keywords and/or corresponding affinity values of the second user may be predicted based on one or more keywords and/or corresponding affinity values of first second user. In other words, based on a match of, for example, demographic characteristics between two users, keywords and/or corresponding affinity values of one user may be associated with the other user.

Further, in some embodiments, a result of comparison of a keyword and a corresponding affinity value corresponding to each of the first user and the second user may be associated with a confidence value. Additionally, the predicting may be associated with an aggregated confidence value computed based on aggregating confidence values corresponding to each keyword and corresponding affinity value of a plurality of keywords and corresponding affinity values. This is explained in detail in conjunction with FIG. 5.

IV. Platform Architecture

The user profile creation platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, platform 100 may be hosted on a centralized server, such as, for example, a cloud computing service. Although methods 200 and 700A to 700C have been described to be performed by a computing device 1100, it should be understood that, in some embodiments, different operations may be performed by different networked elements in operative communication with computing device 1100.

Embodiments of the present disclosure may comprise a system having a memory storage and a processing unit. The processing unit coupled to the memory storage, wherein the processing unit is configured to perform the stages of methods 200 and 700A to 700C.

Figure 11:
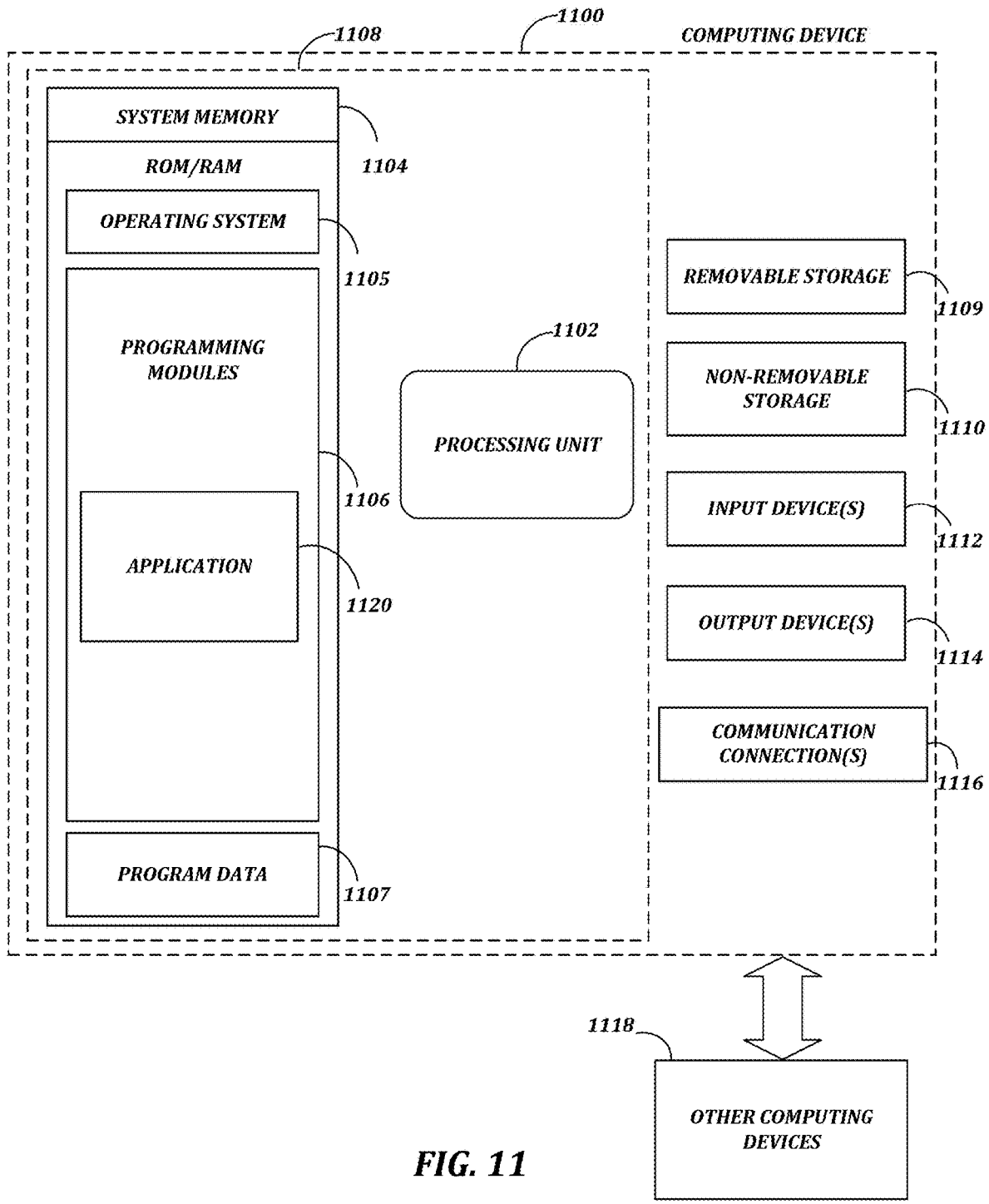
FIG. 11 is a block diagram of a system including a computing device for performing the methods of FIG. 2 and FIG. 7A to FIG. 7C.

FIG. 11 is a block diagram of a system including computing device 1100. Consistent with an embodiment of the disclosure, the aforementioned memory storage and processing unit may be implemented in a computing device, such as computing device 1100 of FIG. 11. Any suitable combination of hardware, software, or firmware may be used to implement the memory storage and processing unit. For example, the memory storage and processing unit may be implemented with computing device 1100 or any of other computing devices 1118, in combination with computing device 1100. The aforementioned system, device, and processors are examples and other systems, devices, and processors may comprise the aforementioned memory storage and processing unit, consistent with embodiments of the disclosure.

With reference to FIG. 11, a system consistent with an embodiment of the disclosure may include a computing device, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include affinity calculating modules, such as, for example, webpage affinity calculation application 1120. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1104, including operating system 1105. While executing on processing unit 1102, programming modules 1106 (e.g., platform application 1120) may perform processes including, for example, one or more of methods 200 and 700A to 700C's stages as described above. The aforementioned process is an example, and processing unit 1102 may perform other processes.

Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The application includes at least the following aspects:

Aspect 1. A method of creating profiles of a plurality of users based on user behavior, wherein the method is a computer implemented method, the method comprising:
  a. receiving a plurality of Universal Resource Locators (URLs) corresponding to a plurality of webpages visited by a user of the plurality of users;
  b. retrieving content from each of the plurality of webpages based on the plurality of URLs;
  c. analyzing content from each of the plurality of webpages, wherein analyzing content from a webpage comprises analyzing content corresponding to at least one content type present on the webpage; and
  d. identifying a plurality of keywords corresponding to the webpage based on the analyzing, wherein the plurality of keywords constitute a profile of the user.

Aspect 2. The method of Aspect 1, wherein the plurality of keywords is associated with a plurality of affinity values, wherein the profile of the user further comprises the plurality of affinity values.

Aspect 3. The method of Aspect 1, wherein the analyzing comprises performing Natural Language Processing (NLP) of a textual content comprised in the webpage.

Aspect 4. The method of Aspect 1, wherein the webpage comprises each of a textual content and a non-textual content.

Aspect 5. The method of Aspect 4, wherein the non-textual content comprises at least one of an audio content, an image, a video content and a multimedia content.

Aspect 6. The method of Aspect 4, wherein the analyzing further comprises converting the non-textual content into a textual content.

Aspect 7. The method of Aspect 2 further comprising determining an aggregated affinity value corresponding to a keyword based on a first affinity value of the keyword corresponding to a first webpage and a second affinity value of the keyword corresponding to a second webpage.

Aspect 8. The method of Aspect 7, wherein the aggregated affinity value is further based on a time decay value associated with each of the first affinity value and the second affinity value.

Aspect 9. The method of Aspect 2 further comprising predicting a first part of a first profile corresponding to a first user based on a first part of the second profile corresponding to a second user, wherein the predicting is based on a result of a comparison between a second part of the first profile and a second part of the second profile.

Aspect 10. The method of Aspect 9, wherein a profile of a user further comprises at least one characteristic of the user.

Aspect 11. The method of Aspect 9, wherein the at least one characteristic comprises at least one of a demographic characteristic, a psychographic characteristic, a firmographic characteristic, a user interest and a hobby.

Aspect 12. The method of Aspect 9, wherein the first part comprises at least one characteristic of the first user, wherein the second part comprises at least one keyword and at least one corresponding affinity value.

Aspect 13. The method of Aspect 12, wherein a result of comparison of a keyword and a corresponding affinity value corresponding to each of the first user and the second user is associated with a confidence value, wherein the predicting is associated with an aggregated confidence value, wherein the aggregated confidence value is computed based on aggregating confidence values corresponding to each keyword and corresponding affinity value of a plurality of keywords and corresponding affinity values.

Aspect 14. The method of Aspect 9, wherein the first part comprises at least one keyword and at least one corresponding affinity value, wherein the second part comprises at least one characteristic of the first user.

Aspect 15. The method of Aspect 2, the profiles comprise a group profile corresponding to a plurality of users, wherein the group profile comprises a plurality of keywords and a corresponding plurality of group affinity values, wherein a group affinity value of a keyword is based on aggregation of affinity values of the keyword associated with the plurality of users.

Aspect 16. The method of Aspect 1, wherein at least one advertisement is presented to the plurality of users based on the profiles.

Aspect 17. A system for creating profiles of plurality of users based on user behavior, wherein the system comprises:
  a. a communication module configured to:
    i. receive a plurality of Universal Resource Locators (URLs) corresponding to a plurality of webpages visited by a user of the plurality of users; and ii. retrieve content from each of the plurality of webpages based on the plurality of URLs;
b. a processing module coupled to the communication module, wherein the processing module is configured to:
i. analyze content from each of the plurality of webpages, wherein analyzing content from a webpage comprises analyzing content corresponding to at least one content type present on the webpage; and
ii. identify a plurality of keywords corresponding to the webpage based on the analyzing, wherein the plurality of keywords constitutes a profile of the user; and
c. a storage module coupled to the processor module, wherein the storage module is configured to store the profiles.

Aspect 18. The system of Aspect 17, wherein the plurality of keywords is associated with a plurality of affinity values, wherein the profile further comprises the plurality of affinity values.

Aspect 19. The system of Aspect 17, wherein the analyzing comprises performing Natural Language Processing (NLP) of a textual content comprised in the webpage.

Aspect 20. The system of Aspect 17, wherein the webpage comprises each of a textual content and a non-textual content.

Aspect 21. The system of Aspect 20, wherein the non-textual content comprises at least one of an audio content, an image, a video content and a multimedia content.

Aspect 22. The system of Aspect 20, wherein the analyzing further comprises converting the non-textual content into a textual content.

Aspect 23. The system of Aspect 18, wherein the processing module is further configured to determine an aggregated affinity value corresponding to a keyword based on a first affinity value of the keyword corresponding to a first webpage and a second affinity value of the keyword corresponding to a second webpage.

Aspect 24. The system of Aspect 23, wherein the aggregated affinity value is further based on a time decay value associated with each of the first affinity value and the second affinity value.

Aspect 25. The system of Aspect 18, wherein the processing module is further configured to predict a first part of a first profile corresponding to a first user based on a first part of the second profile corresponding to a second user, wherein the predicting is based on a result of a comparison between a second part of the first profile and a second part of the second profile.

Aspect 26. The system of Aspect 25, wherein a profile of a user further comprises at least one characteristic of the user.

Aspect 27. The system of Aspect 26, wherein the at least one characteristic comprises at least one of a demographic characteristic, a psychographic characteristic, a firmographic characteristic, a user interest and a hobby.

Aspect 28. The system of Aspect 26, wherein the first part comprises at least one characteristic of the first user, wherein the second part comprises at least one keyword and at least one corresponding affinity value.

Aspect 29. The system of Aspect 17, wherein a result of comparison of a keyword and a corresponding affinity value corresponding to each of the first user and the second user is associated with a confidence value, wherein the predicting is associated with an aggregated confidence value, wherein the aggregated confidence value is computed based on aggregating confidence values corresponding to each keyword and corresponding affinity value of a plurality of keywords and corresponding affinity values.

Aspect 30. The system of Aspect 26, wherein the first part comprises at least one keyword and at least one corresponding affinity value, wherein the second part comprises at least one characteristic of the first user.

Aspect 31. The system of Aspect 18, the profiles comprises a group profile corresponding to a plurality of users, wherein the group profile comprises a plurality of keywords and a corresponding plurality of group affinity values, wherein a group affinity value of a keyword is based on aggregation of affinity values of the keyword associated with the plurality of users.

Aspect 32. The system of Aspect 17, wherein at least one advertisement is presented to the plurality of users based on the profiles.

Aspect 33. A non-transitory computer-readable medium having computer-readable instructions stored thereon that are executable by a processor to:
a. receive, using a communication module, a plurality of Universal Resource Locators (URLs) corresponding to a plurality of webpages visited by a user of the plurality of users;
b. retrieve, using a communication module, content from each of the plurality of webpages based on the plurality of URLs;
c. analyze, using the processor, content from each of the plurality of webpages, wherein analyzing content from a webpage comprises analyzing content corresponding to at least one content type present on the webpage; and
d. identify, using the processor, a plurality of keywords corresponding to the webpage based on the analyzing, wherein the plurality of keywords constitutes a profile of the user.

Aspect 34. The non-transitory computer readable medium of Aspect 33, wherein the plurality of keywords is associated with a plurality of affinity values, wherein the profile further comprises the plurality of affinity values.

Aspect 35. The non-transitory computer readable medium of Aspect 33, wherein the analyzing comprises performing Natural Language Processing (NLP) of a textual content comprised in the webpage.

Aspect 36. The non-transitory computer readable medium of Aspect 33, wherein the webpage comprises each of a textual content and a non-textual content.

Aspect 37. The non-transitory computer readable medium of Aspect 36, wherein the non-textual content comprises at least one of an audio content, an image, a video content and a multimedia content.

Aspect 38. The non-transitory computer readable medium of Aspect 36, wherein the analyzing further comprises converting the non-textual content into a textual content.

Aspect 39. The non-transitory computer readable medium of Aspect 34, wherein the computer-readable medium further comprises instructions stored thereon that are executable by a processor to determine an aggregated affinity value corresponding to a keyword based on a first affinity value of the keyword corresponding to a first webpage and a second affinity value of the keyword corresponding to a second webpage.

Aspect 40. The non-transitory computer readable medium of Aspect 39, wherein the aggregated affinity value is further based on a time decay value associated with each of the first affinity value and the second affinity value.

Aspect 41. The non-transitory computer readable medium of Aspect 34, wherein the computer-readable medium further comprises instructions stored thereon that are executable by a processor to predict a first part of a first profile corresponding to a first user based on a first part of the second profile corresponding to a second user, wherein the predicting is based on a result of a comparison between a second part of the first profile and a second part of the second profile.

Aspect 42. The non-transitory computer readable medium of Aspect 41, wherein a profile of a user further comprises at least one characteristic of the user.

Aspect 43. The non-transitory computer readable medium of Aspect 42, wherein the at least one characteristic comprises at least one of a demographic characteristic, a psychographic characteristic, a firmographic characteristic, a user interest and a hobby.

Aspect 44. The non-transitory computer readable medium of Aspect 41, wherein the first part comprises at least one characteristic of the first user, wherein the second part comprises at least one keyword and at least one corresponding affinity value.

Aspect 45. The non-transitory computer readable medium of Aspect 44, wherein a result of comparison of a keyword and a corresponding affinity value corresponding to each of the first user and the second user is associated with a confidence value, wherein the predicting is associated with an aggregated confidence value, wherein the aggregated confidence value is computed based on aggregating confidence values corresponding to each keyword and corresponding affinity value of a plurality of keywords and corresponding affinity values.

Aspect 46. The non-transitory computer readable medium of Aspect 41, wherein the first part comprises at least one keyword and at least one corresponding affinity value, wherein the second part comprises at least one characteristic of the first user.

Aspect 47. The non-transitory computer readable medium of Aspect 34, the profiles comprise a group profile corresponding to a plurality of users, wherein the group profile comprises a plurality of keywords and a corresponding plurality of group affinity values, wherein a group affinity value of a keyword is based on aggregation of affinity values of the keyword associated with the plurality of users.

Aspect 48. The non-transitory computer readable medium of Aspect 33, wherein at least one advertisement is presented to the plurality of users based on the profiles.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method of creating profiles of a plurality of users based on user behavior, wherein the method is a computer implemented method, the method comprising:
   receiving a plurality of Universal Resource Locators (URLs) corresponding to a plurality of webpages visited by a user of the plurality of users, the user associated with accessing the plurality of URLs from multiple devices;
   retrieving content from each of the plurality of webpages based on the plurality of URLs, the content categorized into content from the plurality of web pages accessed by the user from a first of the multiple devices and content from webpages accessed by the user from a second of the multiple devices;
   analyzing the content of the plurality of webpages that are accessed from each of the first of the multiple devices and the second of the multiple devices, wherein analyzing content from each of the plurality of webpages accessed from each of the first and the second of the multiple devices includes analyzing content corresponding to at least one content type present on each of the plurality of webpages;
   instantiating a first tracking cookie with a first timestamp corresponding to the user's visiting of a first one of the plurality of webpages that is accessed from the first of the multiple devices;
   instantiating a second tracking cookie with a second timestamp corresponding to the user's visiting of a second one of the plurality of webpages that is accessed from the second of the multiple devices;
   determining a correlation value for the first tracking cookie and the second tracking cookie;
   comparing the correlation value to a threshold value;
   determining that the correlation value meets or exceeds the threshold value;
   associating the first of the multiple devices and the second of the multiple devices with the user based on the determination that the correlation value meets or exceeds the threshold value; and
   creating a user profile based on the analyzed content of the plurality of webpages that are accessed from the first and the second of the multiple devices.

2. The method of claim 1, wherein analyzing the content of the plurality of webpages that are accessed from each of the first and the second of the multiple devices further includes determining keywords associated with the plurality of webpages accessed from each of the first and the second of the multiple devices, the method further comprising:
   calculating respective affinity values for the keywords, wherein creating the user profile is also based on the respective affinity values.

3. The method of claim 2, further comprising determining an aggregated affinity value corresponding to each of the keywords based on a first affinity value of a keyword corresponding to the first one of the plurality of webpages and a second affinity value of a keyword corresponding to the second one of the plurality of webpages.

4. The method of claim 3, wherein the aggregated affinity value is further based on a time decay value associated with each of the first affinity value and the second affinity value.

5. The method of claim 2, further comprising:
analyzing content of a second plurality of webpages that are accessed from each of a first and a second of multiple devices of a second user of the plurality of users;
determining keywords associated with the second plurality of webpages;
calculating respective affinity values for the keywords associated with the second plurality of webpages;
creating, based on the respective affinity values, a user profile for the second user of the plurality of users;
generating respective first confidence values for each of the determined keywords associated with the plurality of webpages and respective second confidence values for each of the determined keywords associated with the second plurality of webpages;
aggregating the first and the second confidence values to produce an aggregated confidence value for each of the determined keywords of the user and the second user of the plurality of users;
predicting one or more keywords of the user based on the aggregated confidence value for each of the determined keywords.

6. The method of claim 2, further comprising merging the user profile with a group profile corresponding to the plurality of users, wherein the group profile includes the keywords and the respective affinity values, wherein a particular affinity value corresponding to a particular keyword among the keywords is based on an aggregation of affinity values corresponding to the particular keyword associated with at least some of the plurality of users.

7. The method of claim 1, wherein analyzing the content of the plurality of webpages that are accessed from each of the first and the second of the multiple devices includes performing Natural Language Processing (NLP) of textual content included in at least some of the plurality of webpages.

8. The method of claim 1, wherein the plurality of webpages includes both textual content and non-textual content.

9. The method of claim 8, wherein the non-textual content includes at least one of an audio content, an image, video content, and multimedia content.

10. The method of claim 8, further comprising converting the non-textual content into the textual content.

11. The method of claim 1, wherein creating the user profile further includes at least one user characteristic.

12. The method of claim 11, wherein the at least one user characteristic includes at least one of a demographic characteristic, a psychographic characteristic, a firmographic characteristic, a user interest and a hobby.

13. The method of claim 1, further comprising outputting the user profile in response to a user profile inquiry; and
in response to the user profile inquiry, presenting an advertisement to the user based on the user profile.

14. A non-transitory computer-readable medium having computer-readable instructions stored thereon that are executable by a processor configured to:
receive a plurality of Universal Resource Locators (URLs) corresponding to a plurality of webpages visited by a user of the plurality of users, the user associated with accessing the plurality of URLs from multiple devices;
retrieve content from each of the plurality of webpages based on the plurality of URLs, the content categorized into content from the plurality of webpages accessed by the user from a first of the multiple devices and content from the plurality of webpages accessed by the user from a second of the multiple devices;
analyze the content of the plurality of webpages that are accessed from each of the first of the multiple devices and the second of the multiple devices, wherein analyzing content from each of the plurality of webpages accessed from each of the first and second of the multiple devices includes analyzing content corresponding to at least one content type present on each of the plurality of webpages;
instantiate a first tracking cookie with a first timestamp corresponding to the user's visiting of a first one of the plurality of webpages that is accessed from the first of the multiple devices;
instantiate a second tracking cookie with a second timestamp corresponding to the user's visiting of a second one of the plurality of webpages that is accessed from the second of the multiple devices;
determine a correlation value for the first tracking cookie and the second tracking cookie;
compare the correlation value to a threshold value;
determine that the correlation value meets or exceeds the threshold value;
associate the first of the multiple devices and the second of the multiple devices with the user based on the determination that the correlation value meets or exceeds the threshold value; and
create a user profile based on the analyzed content of the plurality of webpages that are accessed from the first and the second of the multiple devices.

* * * * *